United States Patent
Singh

(10) Patent No.: US 12,290,840 B2
(45) Date of Patent: May 6, 2025

(54) METHOD AND SIEVE SYSTEM FOR SCREENING MATERIAL

(71) Applicant: Russell Finex Ltd, Feltham (GB)

(72) Inventor: Resham Singh, Feltham (GB)

(73) Assignee: Russell Finex Ltd, Feltham (GB)

( * ) Notice: Subject to any disclaimer, the term of this patent is extended or adjusted under 35 U.S.C. 154(b) by 282 days.

(21) Appl. No.: 17/776,773

(22) PCT Filed: Nov. 6, 2020

(86) PCT No.: PCT/GB2020/052817
§ 371 (c)(1),
(2) Date: May 13, 2022

(87) PCT Pub. No.: WO2021/094715
PCT Pub. Date: May 20, 2021

(65) Prior Publication Data
US 2022/0395863 A1 Dec. 15, 2022

(30) Foreign Application Priority Data
Nov. 15, 2019 (GB) ..................... 1916697

(51) Int. Cl.
*B07B 1/46* (2006.01)
(52) U.S. Cl.
CPC .......... *B07B 1/4636* (2013.01); *B07B 1/4627* (2013.01)
(58) Field of Classification Search
CPC ....... B07B 1/4636; B07B 1/4627; B07B 1/38; B07B 13/16; B07B 13/18; B07B 1/46;
(Continued)

(56) References Cited

U.S. PATENT DOCUMENTS

| 4,544,101 A * | 10/1985 | Hahn | B07B 9/00 241/24.1 |
|---|---|---|---|
| 4,627,576 A | 12/1986 | Hahn et al. | |

(Continued)

FOREIGN PATENT DOCUMENTS

| DE | 2443548 A1 | 3/1976 |
|---|---|---|
| KR | 101 823 402 B1 | 1/2018 |

(Continued)

OTHER PUBLICATIONS

Search Report in corresponding Application No. GB1916697.4, mailed May 6, 2020, 5 pgs.

(Continued)

*Primary Examiner* — Patrick H Mackey
(74) *Attorney, Agent, or Firm* — Young Basile Hanlon & MacFarlane, P.C.

(57) ABSTRACT

A sieve system includes a sieve for screening material by selectively passing first particles and not passing second particles of the material based on respective dimensions of the particles relative to dimensions of screening apertures in the sieve. A holding container feeds material to the sieve and a fines container receives the first particles screened by the sieve. A first fines container load is measured at a first time, and a second fines container load is measured at a second time. A fines rate is determined by a rate of change of the fines container load based on the measured first and second fines container loads and the first and second times. An operating condition of the sieve system is based on the fines rate and may provide an indication that the operation of the sieve, another component, or the sieve system as a whole is acceptable or unacceptable.

19 Claims, 13 Drawing Sheets

(58) Field of Classification Search
CPC ..... B07B 13/14; B29C 64/357; B29C 64/314; B33Y 40/10

See application file for complete search history.

(56) References Cited

U.S. PATENT DOCUMENTS

| | | | |
|---|---|---|---|
| 4,809,791 A * | 3/1989 | Hayatdavoudi | E21B 44/00 175/206 |
| 6,129,216 A * | 10/2000 | Vandewinckel | G03G 21/10 209/660 |
| 6,575,303 B1 * | 6/2003 | Brock | G01N 5/02 209/238 |
| 6,585,116 B1 | 7/2003 | Doelle et al. | |
| 7,128,204 B2 * | 10/2006 | Baranowski | G01G 19/393 222/161 |
| 9,919,360 B2 * | 3/2018 | Buller | B22F 12/49 |
| 9,962,767 B2 * | 5/2018 | Buller | B23K 26/144 |
| 2011/0285541 A1 | 11/2011 | Freissle et al. | |
| 2016/0193696 A1 | 7/2016 | McFarland et al. | |
| 2017/0056928 A1 * | 3/2017 | Torrione | B07B 1/42 |
| 2021/0283846 A1 * | 9/2021 | Otis, Jr. | B33Y 30/00 |
| 2021/0323030 A1 * | 10/2021 | Shawi Sanchez | B07B 1/40 |
| 2022/0194008 A1 * | 6/2022 | Van Iersel | B33Y 30/00 |

FOREIGN PATENT DOCUMENTS

| | | |
|---|---|---|
| WO | 2011/115508 A1 | 9/2011 |
| WO | 2013/160864 A1 | 10/2013 |
| WO | 2014/136121 A1 | 9/2014 |

OTHER PUBLICATIONS

Examination Report in corresponding Application No. GB1916697.4, mailed Sep. 9, 2021, 4 pgs.

Examination Report in corresponding Application No. GB11916697.4, mailed Oct. 13, 2021, 2 pgs.

International Search Report and Written Opinion in PCT/GB2020/052817, mailed Feb. 22, 2021, 13 pgs.

* cited by examiner

METHOD AND SIEVE SYSTEM FOR SCREENING MATERIAL

TECHNICAL FIELD

The present disclosure relates to a method and sieve system for screening material, such as powders or solids in liquids. In particular, the disclosure relates to a method and sieve system for determining and monitoring an operating condition of the sieve system during use. The method and system may thereby allow a physical condition of the sieve system, such as the health of the sieve system, to be determined and monitored.

BACKGROUND

Sieves are used for check-screening materials to remove unwanted, oversize material and/or for grading or sizing materials. A sieve is typically provided with a screen held on a frame, which may be vibrated to encourage product movement on and through the screen. Some sieves are also vibrated by secondary vibrations such as ultrasonic vibration, applied directly to the screen itself, to further improve performance.

FIG. 1 shows schematically a known sieving machine 10, manufactured as the Russell Minisifter Sieve by Russell Finex. A sieve 12 comprises a screen 14 stretched, or simply held (in a non-tensioned manner), in a frame 16. The screen 14 may take the form of a mesh screen, a wedge wire screen, or a punch plate screen, among other forms. The sieve 12 is mounted on a chassis 18 and has a cover 20 secured over it. The chassis 18 may itself be mounted on a stationary or mobile frame (not shown). One or more motors 22 is arranged to impart vibratory motion to the chassis 18, typically by being eccentrically weighted.

A feed inlet 24 is provided in the cover 20, for the supply of material onto the sieve 12. Vibration of the sieve 12 encourages undersized material 30 to pass through the screen 14, while oversized material 26 does not. Oversized material 26 may be transported across the screen 14 to an oversize discharge outlet 28, which may be gated. Undersized material 30 passes through the screen 14 to a fines discharge outlet 32. In this way, screening or sizing of material is thereby possible.

The condition of such a screen will deteriorate over time, with repeated or sustained use or accidental damage from foreign bodies. When damage to the sieve reaches the point of breakage in the screen, for example in the form of a hole or a tear, replacement of the screen becomes necessary. It is desirable to be able to detect the breakage as close to its occurrence as possible, so that operation of the sieving machine may be promptly stopped. This can help to reduce or minimize the amount of material wrongly screened or graded by the damaged sieve and also reduce or minimize the hazard of fragments of the broken screen unknowingly contaminating processed material.

An additional or alternative problem is that, over a period of general operation of a screen, and/or due to overloading of the screen with an excess of material, some or all of the apertures (or screening holes) of the screen can become blocked or blinded; in particular with near-size or irregularly shaped particles being processed. When this occurs, the screen needs to be removed for inspection and cleaning, and in some cases to be replaced.

An alternative and/or improved method and sieve system for screening material in view of the above background would therefore be of interest.

BRIEF SUMMARY

In accordance with this disclosure, there is provided a method for screening material in a sieve system comprising: a sieve for screening material by selectively passing first particles of the material and not passing second particles of the material based on respective dimensions of the first and second particles relative to dimensions of screening apertures in the sieve; a holding container for feeding material to be screened to the sieve; and a fines container for receiving the first particles screened by the sieve, the method comprising: measuring a first fines container load at a first time; measuring a second fines container load at a second time; determining a fines rate by determining a rate of change of the fines container load based on the measured first and second fines container loads and the first and second times; and determining an operating condition of the sieve system based on the determined fines rate.

The operating condition may provide an indication that the operation of the sieve or another component or the sieve system as a whole is acceptable or unacceptable. In this way, the rate at which the fines container is filled, which may be determined from the rate of change of the loading of the fines container over time, can be monitored. If the fines rate is determined to lie within an acceptable range—for example, between a pre-determined low set point and a pre-determined high set point—then the operation of the sieve may be considered acceptable. If the fines rate is determined to lie outside of an acceptable range, then the operation of the sieve may be considered unacceptable. In this case, pre-emptive, corrective, and/or restorative action may be taken.

A fines rate high set point may indicate unacceptable operation of the sieve; in particular, because material is being received by the fines container too quickly. The fines rate high set point being reached may be indicative of a broken or damaged or missing sieve. Thus, the controller may determine the operating condition to be representative of a damaged or missing sieve. In response to determining the operating condition to be representative of a damaged sieve or a missing sieve, the controller may stop operation of the sieve system. The sieve may then be inspected and repaired or replaced.

The inventors have also recognized that the performance and/or operational lifespan of a sieve may be affected by either underfeeding or overfeeding material to the sieve. Thus, a further problem that may be solved by one or more sieve systems described herein is the detection of oversize material on the mesh. The sieving rate may drop off when there is a large amount of oversize material on the screen. Also, the potential of the screen becoming blocked is higher. By monitoring this and removing oversize during the sieving process, the throughput can be increased and the time between screen cleans may be reduced.

In one or more examples, the method may further comprise determining that the fines rate is equal to or lower than a fines rate low set point and determining the operating condition to be representative, or further representative, of an excess of material, e.g., powder, on the sieve. The fines rate low set point may be a pre-determined value that is set for a particular material to be screened and/or for the particular physical configuration of the sieve system and is determined to represent a fill rate of the fines container that is too low for the sieve system to achieve under acceptable, normal operating conditions. The fines rate low set point may therefore indicate unacceptable operation of the sieve; in particular, because material is being received by the fines container too slowly. The fines rate low set point being reached may be indicative of an excess of material on the sieve. Thus, the controller may determine the operating condition to be representative, or further representative, of an excess of material on the sieve.

The method may optionally further comprise discharging material from the sieve to an oversize discharge outlet for removing the second particles from the sieve in response to determining the operating condition to be representative, or further representative, of an excess of material on the sieve. If the cause of the excess material on the sieve is a build-up of second particles of oversize material, then this step should remove some or all of the second particles and allow an increased number of first particles of undersize material to reach the screen of the sieve and be passed into the fines container once again. In this way, the fines rate low set point may be pre-determined to trigger an automatic oversize removal procedure.

In accordance with this disclosure, there is also provided a sieve system for screening material, the sieve system comprising: a sieve for screening material by selectively passing first particles of the material and not passing second particles of the material based on respective dimensions of the first and second particles relative to dimensions of screening apertures in the sieve; a holding container for feeding material to be screened to the sieve; a fines container for receiving the first particles screened by the sieve; a fines load sensor for measuring a fines container load; and a controller configured to perform a method comprising: measuring a first fines container load at a first time; measuring a second fines container load at a second time; determining a fines rate by determining a rate of change of the fines container load based on the measured first and second fines container loads and the first and second times; and determining an operating condition of the sieve system based on the determined fines rate.

In accordance with this disclosure, there is also provided a 3D printing system comprising: an additive manufacturing system comprising a build chamber; and a sieve system as described herein. Optionally, the additive manufacturing system and the sieve system form a closed loop system.

Other preferred features and advantages are set out in the description and in the dependent claims that are appended hereto.

BRIEF DESCRIPTION OF THE DRAWINGS

The disclosure may be put into practice in a number of ways and some embodiments will now be described, by way of non-limiting example only, with reference to the following figures.

DETAILED DESCRIPTION

Figure 1:
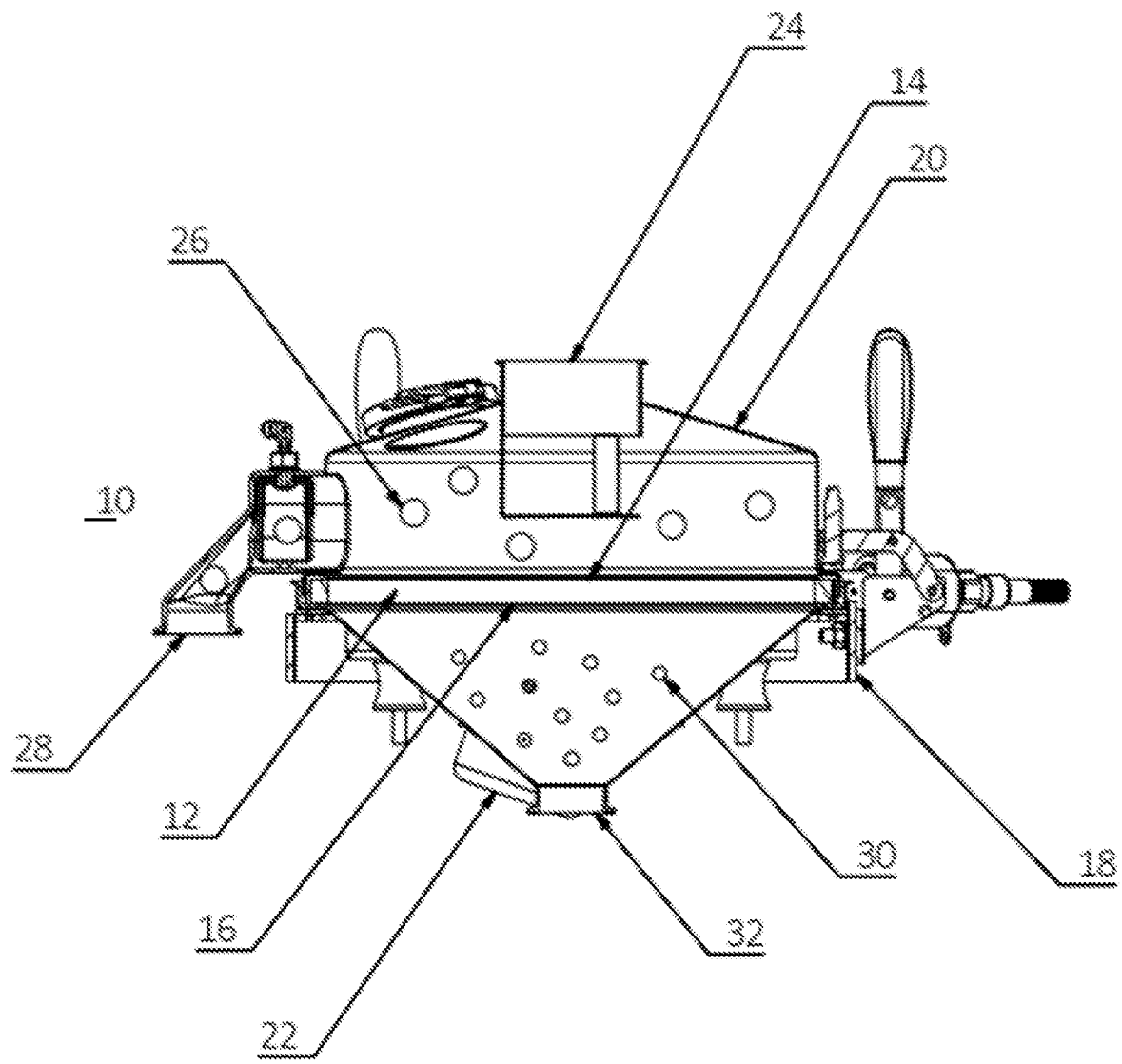
FIG. 1 shows schematically a known sieving machine, manufactured as the Russell Minisifter Sieve® by Russell Finex.
Figure 2:
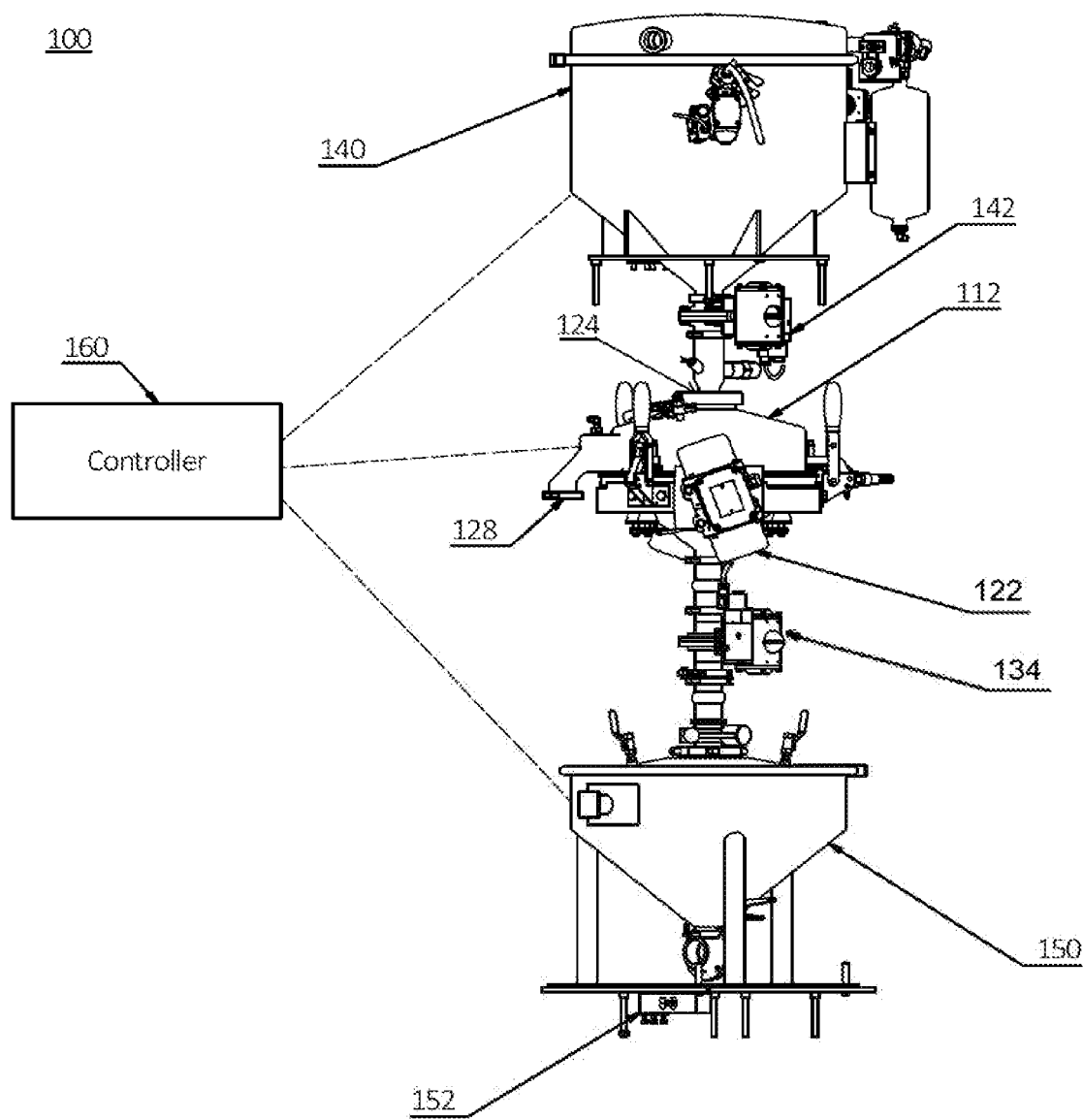
FIG. 2 shows schematically a sieve system including a sieve, a feed hopper, a fines container, and a controller in accordance with one or more embodiments of the disclosure.

Referring to FIG. 2, there is shown a sieve system 100 for screening material in accordance with one or more embodiments. The material may be in the form of a powder, may be present in a liquid as solid particles, or may be present in a liquid in the form of a suspension of solid particles, for example. For ease of discussion, reference is made herein to material in powder form, but it will be understood that the disclosed arrangements may readily be used with material and particles in other forms.

The sieve system has a sieve 112, a feed container 140, a fines container 150, and a controller 160. The sieve 112 is configured to screen powder by selectively passing first particles of the powder, also referred to as fines, and not passing second particles of the powder, also referred to as oversize particles. The screening is based on respective dimensions of the first and second particles relative to dimensions of screening apertures provided in the screen of the sieve. In particular, two or all of the dimensions of the first particles—or, in some examples, especially with irregularly shaped particles, cross-sectional dimensions of the first particles—are smaller than the dimensions of the screening apertures (which may be square, circular, or other shapes). In this way, the first particles may pass through the screening apertures. On the other hand, two or all of the dimensions of the second particles—or, in some examples, especially with irregularly shaped particles, cross-sectional dimensions of the second particles—are greater than the dimensions of the screening apertures. In this way, the second particles may not pass through the screening apertures. It will be appreciated that the particles to be screened may take a variety of forms, including regular and irregular shapes; for example, having regular and/or irregular cross-sectional shapes, and/or having regular or irregular overall shapes of the particles.

The sieve 112 is configured to be fed powder to be screened from the feed container 140. The feed container 140 may also be referred to as a holding container. The feed container 140 may take a number of forms, including the form of a hopper. In the example shown in FIG. 2, powder to be screened is provided to the sieve 112 from the feed container 140 through a feed valve 142. The feed valve 142 may be used to control the discharge, and optionally the rate of discharge, from the feed container 140. In some arrangements, a feed nozzle may be fitted to control the flow of powder onto the sieve 112. The nozzle size may be selected based on the flow characteristics of the powder to be screened. The feed valve 142 may be used to further control the rate of powder discharge into the sieve. To encourage the powder to pass from the feed container 140 into the sieve 112, a pneumatic hammer or the like may be provided to agitate the powder between the feed container and the sieve. This may also help to prevent clumping of the powder and potential blockages in the system. In this example, the feed container 140 supplies the powder to be screened to the sieve 112 via a feed inlet 124 of the sieve.

In some arrangements, the feed valve 142 itself may be provided by a pneumatic hammer. In this way, the pneumatic hammer operates to control the discharge of material from the feed container 140 and to encourage the material to pass from the feed container into the sieve 112. In one example, the hammer may block or close off the feed as a default position and open up the feed upon activation to allow material to pass into the sieve 112. The hammer action may be provided by a pneumatic hammer solenoid or an ultrasonic actuator, among others.

The screen of the sieve 112 is vibrated by one or more motors 122. Vibration of the sieve 112 encourages the first particles of undersized material to pass through the screen, while the second particles of oversized material do not. In arrangements in which two motors 122 are arranged generally opposite each other, the resulting vibration pattern may be configured to have the effect of generally maintaining the material at, and distributed around the centre of, the screen, for a relatively even sieving characteristic. Intermittently during operation, the motor 122 nearest to an oversize discharge outlet 128 may be switched off so that subsequent vibration of the sieve 112 transports oversized material across the screen to the oversize discharge outlet 128. More than two motors 122 may also be used and distributed around the sieve 112 to provide such a vibration pattern and oversize particle-removal function. If only one motor 122 is employed, the motor 122 may be positioned and configured generally to transport oversize material towards the oversize discharge outlet 128. For example, the motor 122 may be positioned generally opposite the oversize discharge outlet 128. In any of the above arrangements, the oversize discharge outlet 128 may be gated so that material is discharged from the oversize discharge outlet at selected times. This can help to reduce the amount of undersize material inadvertently being discharged from the oversize discharge outlet 128 instead of passing through the screen of the sieve.

Optionally, in any of the arrangements described herein, a deflecting plate may also be added to or above the screen of the sieve, to assist in guiding the oversize material into the oversize discharge outlet 128.

In some arrangements, vibration of the sieve 112 may be decoupled from the surrounding components of the system. This may be achieved in a number of ways, including providing the sieve 112 with rubber, elastomeric, and/or otherwise resilient, vibration mounts. Additionally or alternatively, components that are linked to the sieve 112, for example, by hoses or wires, etc., may be provided with flexible hoses or wires, etc., and/or flexible couplings to and/or from such hoses or wires, etc. The effect of these arrangements is to provide vibration isolation for the sieve 112 from the rest of the system.

The fines container 150 is configured to receive the first particles screened by the sieve 112. The outlet of the sieve 112 may be provided with a fines valve 134. The fines valve 134 may be used to control the discharge of fines into the fines container 150. The fines container 150 may take a number of forms, including the form of a hopper. The fines container 150 may be removable from the sieve system for transporting the collected fines for use in another location. Alternatively or additionally, the fines container 150 may be configured to discharge the collected fines without being removed from the sieve system; for example, through a valve. The discharge may take place by gravity discharge and/or under reduced pressure or vacuum suction.

A fines load sensor 152 is coupled to the fines container 150 and is configured to measure loading of the fines container in the form of a fines container load. The fines load sensor 152 may be provided by a load cell. In the example shown in FIG. 2, the fines container 150 is mounted on the load sensor 152 so that loading of the fines container may be measured. The fines load sensor 152 may take a number of forms, including a single point load cell or a platform load cell. In one arrangement, a platform is mounted on the fines load sensor 152 and is isolated from the surrounding components of the system. The fines container 150 is mounted on the platform so that its loading may be measured.

The controller 160 is communicatively coupled with the sieve 112, the feed container 140, and the fines container 150, including the fines load sensor 152. This is shown schematically in FIG. 2 by the dashed arrows between these components. The couplings may be provided by wired connections with the controller 160 and/or by wireless connections with the controller.

The controller 160 is configured to monitor and control operation of the sieve system 100. In particular, the controller 160 may be configured to start and stop operation of the sieve system 100. During operation of the sieve system 100, the controller 160 may be further configured to monitor and control the various components of the system to ensure that one or more correct sequences of operation take place. The controller 160 may also be configured to monitor and control the various components of the system to ensure that one or more operational parameters of the system remain within respective given limits or set points. If one or more operational parameters are determined to be outside of an acceptable limit or range, the controller 160 may be configured to adjust the one or more operational parameters in order to bring the one or more operational parameters back within the acceptable limit or range. This may be effected by actuating, stopping, or adjusting one or more components of the sieve system 112, such as valves, gates, motors, pneumatic hammers, and the like. Under particular circumstances whereby the one or more operational parameters are not brought back within acceptable range(s) or limit(s) after a given number of attempts to do so, the controller 160 may display and/or sound a notification and/or alarm, and in some cases stop operation of the sieve system 112.

In some examples, the controller 160 is provided by a programmable logic controller (PLC). The PLC is configured to execute a PLC program for monitoring and controlling methods and sieve systems for screening powder. The PLC program may be prepared in a separate computing device, for example using a dedicated programming application on a general purpose computer. The PLC program may then be loaded into memory of the PLC by a direct-connection cable (such as by a USB, Ethernet, RS-232, RS-485, or RS-422 connection), or over a network to which the computer and the PLC are connected. Alternatively, the PLC program may be transferred from a computer to the PLC by means of a programming board that writes the program into a removable chip, such as a programmable read-only memory (PROM); optionally, an erasable programmable read-only memory (EPROM).

Alternatively, the controller 160 may be provided by a more general computing system running dedicated monitoring and control software.

It will be appreciated that, while the controller 160 is shown schematically in the FIGS. as a single component, the controller may be provided in a number of forms. For example, two or more controller modules may be provided and coupled to one or more respective components of the sieve system. In another arrangement, different functional components of the sieve system may be provided with a respective, dedicated sub-controller, each of which communicates with a central controller and/or another of the sub-controllers, by wired or wireless communication. Such a sub-controller may be provided by a respective PLC, a respective programmable logic relay (PLR), or a respective (more general) computing device, or a combination of one or more of these.

The controller 160 is shown in FIG. 2 schematically coupled to the sieve 112, the feed container 140, and the fines container 150. In one example, the coupling takes the form of input and output connections to and from the controller 160, respectively, to sensors and actuators of the sieve system 100. Inputs to the controller 160 from sensors may include digital or analogue inputs or signals. The inputs may include one or more of load readings from one or more load sensors, container fill readings from one or more high-level sensors, oxygen level readings from one or more oxygen sensors, motor current or power overload readings, and one or more inputs from limit switches, temperature sensors, moisture sensors, pressure sensors, earth monitoring systems, and pneumatic pressure switches, among others. Outputs from the controller 160 to actuators may include digital or analogue outputs or signals. The outputs may be configured to actuate, operate, control, and/or stop one or more actuators. The actuators may include one or more of a sieve motor, a valve, a solenoid, a feed valve solenoid, a fines valve solenoid, a filter valve solenoid, a Venturi valve solenoid, a vacuum wand valve solenoid, a pneumatic hammer solenoid, an inflatable/deflatable gate, a purge valve solenoid, an ultrasonic transducer, indicator lamps, alarms, sirens, electric motors, pneumatic or hydraulic cylinders, and magnetic relays, among others.

Optionally, the controller 160 is connected to a user interface, to allow for user configuration, monitoring, and/or control of the sieve system 100. Such a user interface may be referred to as a human-machine interface (HMI), a man-machine interface (MMI), or a graphical user interface (GUI). The user interface may be provided with one or more physical control mechanisms, such as buttons, switches, dials, levers, joysticks, and rollerballs, among others. The user interface may also or alternatively be provided with one or more physical indicators, such as lights, speakers, sirens, alarms, mechanical dials, analogue dials, digital readoutouts, and display screens, among others. The user interface may also or alternatively provide some or all of the control mechanisms and/or indicators by means of one or more display screens. The one or more display screens may be configured for user interaction. For example, the one or more display screens may include a presence-sensitive device, such as a touch-sensitive screen. In this way, a user may provide inputs to control the operation of the sieve system 100 using the one or more display screens.

An example of a method of use of the sieve system 100 shown in FIG. 2 will now be provided. In normal operation, under the control of the controller 160, powder to be screened is fed from the feed container 140 to the sieve 112. One or more motors 122 cause the sieve 112 to vibrate and to screen the powder by passing first particles of undersize material, and not passing second particles of oversize material. The passed first particles are received by the fines container 150. Second particles of oversize material that are not passed are discharged from the sieve through the oversize discharge outlet 128, either intermittently at selected times, or continuously.

During operation, there is limited or no visibility of, or visual access to, operational conditions in the sieve system 100. Any viewing ports or sight glasses that may be provided into the overall system or into individual containers or the sieve tend to provide restricted views, which may become obscured during use and are generally not practical. Furthermore, in view of the time routinely taken to screen a batch of powder, the sieve system 100 may be left unattended or the controller 160 may be further configured to provide a remote monitoring function. The remote monitoring function may be configured to provide operational status information to a remote device and/or to receive control inputs from the remote device. The remote device may be a mobile, portable, or stationary computing device, networked to the sieve system controller 160. Moreover, depending on conditions and the particular powder to be screened, the screen of the sieve is not always checked before and/or after a batch has been processed. If any damage were to go unnoticed, oversize contaminants could potentially pass through the sieve and compromise the quality of the screened powder, or fines.

Given these considerations, the sieve system 100 is configured to determine an operating condition of the sieve system automatically. Depending on the determined operating condition, potential issues may be detected before a malfunction or breakage, for example, occurs. Alternatively or additionally, actual defects may be detected soon after their occurrence so that appropriate repairs or replacements may be made before further damage is caused, and in some cases without needing to discard a part-processed batch of powder. In this way, the sieve system 100 itself may be configured to monitor the health of the system during operation.

Figure 8:
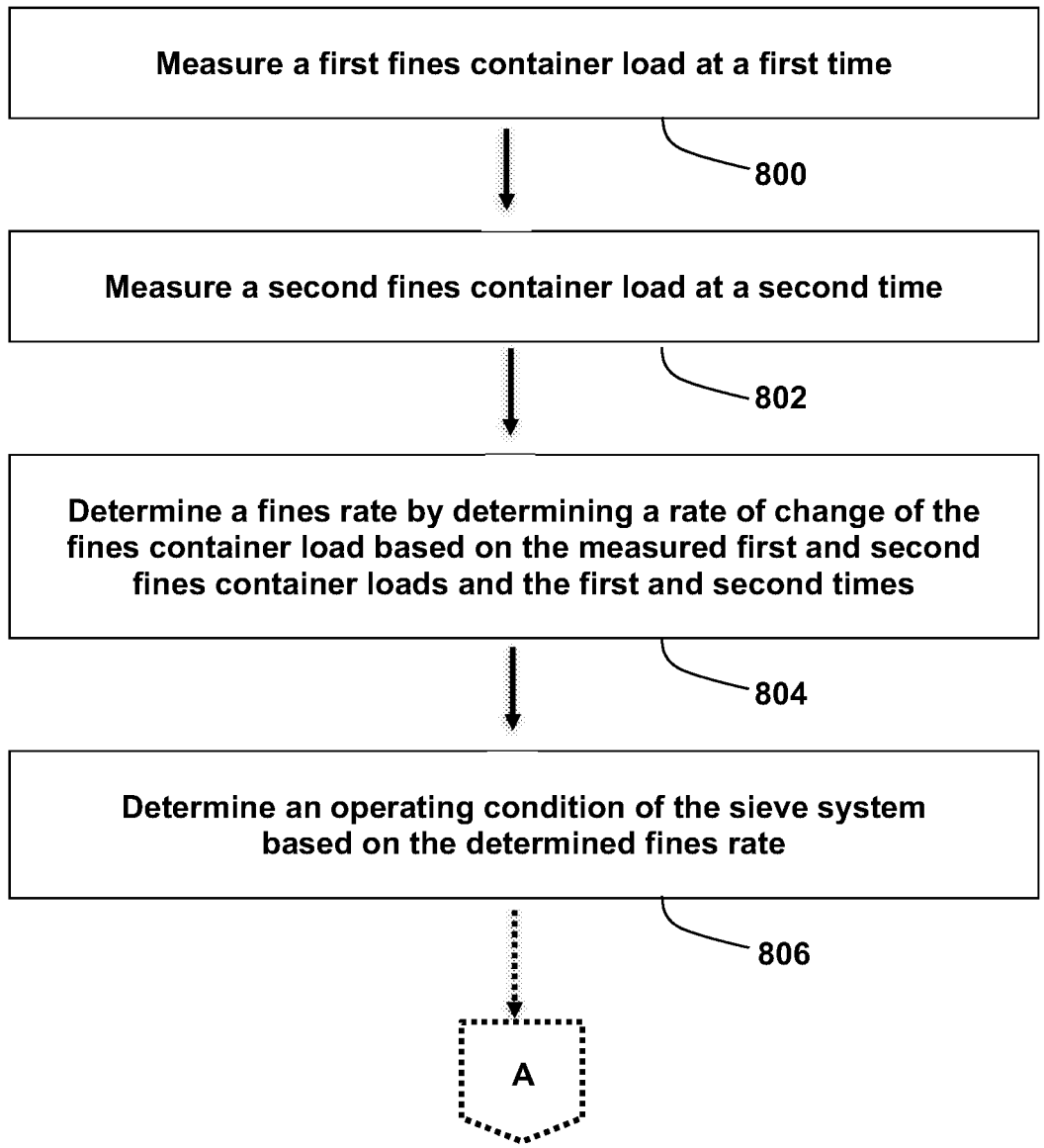
FIG. 8 shows a method of screening powder in a sieve system to determine an operating condition of the sieve system in accordance with one or more embodiments of the disclosure.

In one example, a method for screening powder in the sieve system 100 is provided, as shown in FIG. 8. During operation, the controller 160 measures a first fines container load at a first time (step 800). Subsequently, at a second time, the controller 160 measures a second fines container load (step 802). Based on the measured first and second fines container loads and the first and second times, the controller 160 determines a rate of change of the fines container load and thereby a fines rate (step 804). Based on the determined fines rate, the controller 160 then determines an operating condition of the sieve system (step 806). The operating condition may provide an indication that the operation of the sieve or another component or the sieve system as a whole is acceptable or unacceptable.

In this way, the rate at which the fines container 150 is filled, which may be determined from the rate of change of the loading of the fines container over time, can be monitored. If the fines rate is determined to lie within an acceptable range—for example, between a pre-determined low set point and a pre-determined high set point—then the operation of the sieve may be considered to be acceptable.

If the fines rate is determined to lie outside of an acceptable range, then the operation of the sieve may be considered to be unacceptable. In this case, pre-emptive, corrective, and/or restorative action may be taken.

Figures 9, 10:
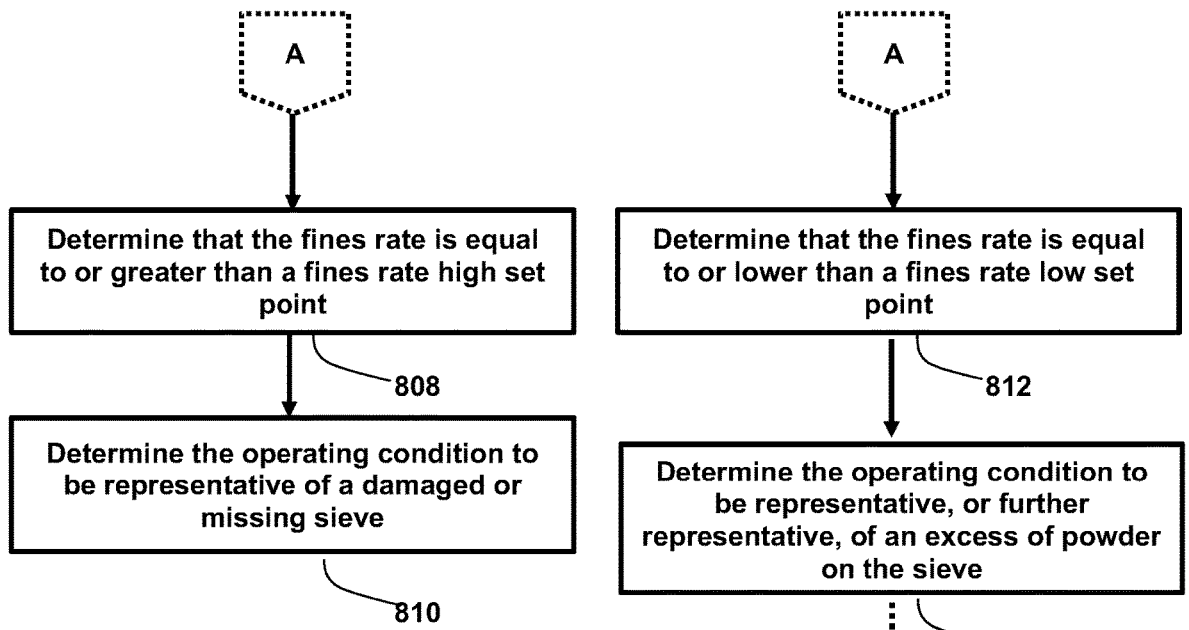
FIG. 9 shows a method for determining the operating condition to be representative of a damaged or missing sieve in accordance with one or more embodiments of the disclosure.
FIG. 10 shows a method for determining the operating condition to be representative, or further representative, of an excess of powder on the sieve, and optionally discharging powder, in accordance with one or more embodiments of the disclosure.

The dashed decision block "A" at the end of the flow diagram of FIG. 8 is shown at the start of the flow diagrams in FIGS. 9 and 10, indicating that the methods shown in FIGS. 9 and 10 are two possible extensions of the method shown in FIG. 8. Following the method of FIG. 9, the sieve system 100 may provide for the determination of a damaged sieve, or a missing sieve. Following the determination of the fines rate in step 804, the controller 160 may determine that the fines rate is equal to or greater than a fines rate high set point (step 808). The fines rate high set point is a pre-determined value that is set for a particular powder to be screened and/or for the particular physical configuration of the sieve system 100. The fines rate high set point is determined to represent a fill rate of the fines container 150 that is too high for the sieve system to achieve under acceptable, normal operating conditions. The fines rate high set point therefore indicates unacceptable operation of the sieve; in particular, because material is being received by the fines container too quickly, the fines rate high set point being reached is indicative of a broken or damaged or missing sieve. Thus, the controller 160 determines the operating condition to be representative of a damaged or missing sieve (step 810).

The sieve may be missing because it was inadvertently not assembled into the sieve system 100 before use, or because the sieve has become so damaged that it has broken up and there is effectively no longer any screening stage in the system. The sieve may alternatively or additionally be damaged by one or more tears or breaks and/or larger holes in the screen of the sieve. While a screening stage may still be present in the system in this case, the damaged sieve allows more powder to pass through than should be permitted so the fill rate of the fines container 150 rises as a result. The damage may result from foreign objects entering the sieve or from large particles or clumps of powder to be screened and/or from general wear, excessive ultrasonic vibration of the sieve, and/or careless handling of the sieve and/or the sieve screen.

In response to determining the operating condition to be representative of a damaged sieve or a missing sieve, the controller 160 may stop operation of the sieve system 100. The sieve may then be inspected and repaired or replaced.

Following the method of FIG. 10, the sieve system 100 may provide for the determination of an excess of powder on the sieve. Following the determination of the fines rate in step 804, the controller 160 may determine that the fines rate is equal to or lower than a fines rate low set point (step 812). The fines rate low set point is a pre-determined value that is set for a particular powder to be screened and/or for the particular physical configuration of the sieve system 100. The fines rate low set point is determined to represent a fill rate of the fines container 150 that is too low for the sieve system to achieve under acceptable, normal operating conditions. The fines rate low set point therefore indicates unacceptable operation of the sieve; in particular, because material is being received by the fines container too slowly, the fines rate low set point being reached is indicative of an excess of powder on the sieve. Thus, the controller 160 determines the operating condition to be representative, or further representative, of an excess of powder on the sieve (step 814).

An excess of powder on the sieve may arise for a number of reasons. One reason may be that there has been a build-up of second particles of oversize material on the sieve. The amount of oversize material in a batch of powder to be screened depends on the type of powder and/or on whether the batch is a fresh, unused, or virgin powder, or powder recycled from another powder-handling process, such as an additive manufacturing system. Oversize material may be removed from the sieve during the powder screening process. This may be continuous, by having the oversize discharge outlet 128 always open. Alternatively, this may be intermittent, by opening a gate or valve—such as an inflatable and deflatable, or pneumatic, seal, or a mechanical valve—at regular intervals, using a timer. In each of these cases, it is possible for an undesirably high proportion of the first particles of undersize material to be lost through the oversize discharge outlet 128, reducing the yield of screened first particles from the sieve system. As such, the sieve system 100 may be configured to open the oversize discharge outlet 128 only when desired or needed and not continuously or at pre-set intervals.

An excess of powder on the sieve may therefore be taken to indicate that there has been a build-up of second particles of oversize material on the sieve. The sieve system 100 may therefore be configured to determine an excess of oversize material and optionally to provide an indication of this and/or to perform an oversize removal procedure.

Following determination that the operating condition is representative, or further representative, of an excess of powder on the sieve (step 814), step 816 of FIG. 10 may be taken. In particular, the controller 160 may be configured to discharge powder from the sieve 112 to the oversize discharge outlet 128 for removing the second particles from the sieve. If the cause of the excess powder on the sieve was a build-up of second particles of oversize material, then this step should remove some or all of the second particles and allow an increased number of first particles of undersize material to reach the screen of the sieve and be passed into the fines container 150 once again. In this way, the fines rate low set point may be pre-determined to trigger an automatic oversize removal procedure.

Figure 11:
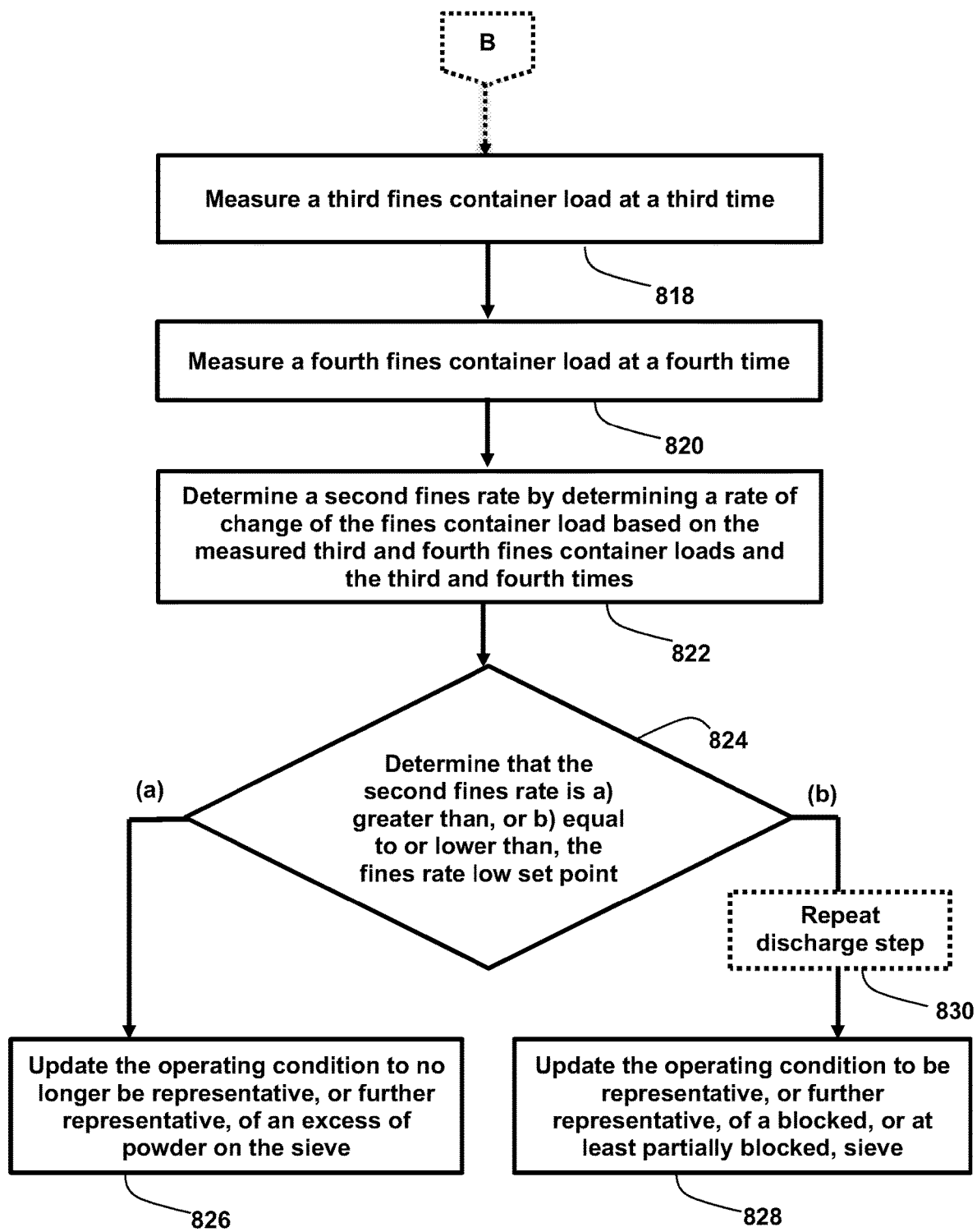
FIG. 11 shows a method for determining whether the discharge step has addressed the determined operating condition of excess of powder in accordance with one or more embodiments of the disclosure.

The dashed block "B" at the end of the flow diagram of FIG. 10 is shown at the start of the flow diagram in FIG. 11, indicating that the method shown in FIG. 11 is a possible extension of the method shown in FIG. 10. Following the method of FIG. 11, after the oversize removal procedure (step 816) a further fines rate determination may be made. In particular, the controller 160 may be configured to measure a third fines container load at a third time (step 818). The controller 160 may be further configured subsequently to measure a fourth fines container load at a fourth time (step 820). Based on the measured third and fourth fines container loads and the third and fourth times, the controller 160 determines a second rate of change of the fines container load and thereby a second fines rate (step 822). The controller 160 then determines whether the second fines rate is a) greater than the fines rate low set point, or b) equal to or lower than the fines rate low set point (step 824). If the second fines rate is determined to be a) greater than the fines rate low set point, this indicates that the problem was a build-up of second particles of oversize material on the sieve and that the oversize removal procedure has addressed the problem. As such, the controller 160 then updates the operating condition to no longer be representative, or further representative, of an excess of powder on the sieve.

Another reason for an excess of powder to be on the sieve may be that the screen of the sieve has become blocked or at least partially blocked. In particular, all of the screening apertures of the sieve screen, or at least a significant proportion of the screening apertures, may have become blocked. Over a period of operation of a screen generally and/or due to overloading the screen with excessive powder, some or all of the screening apertures (or grading holes) of the sieve screen can become blocked, or blinded; in particular with near-size or irregularly shaped particles of the powder being processed. This can affect the condition of the screen, reducing the rate of powder processing. When this occurs, the screen needs to be removed for inspection and cleaning, or, in some cases, replacement.

Generally, a routine inspection programme may be established for physically checking the condition of a sieve screen at regular intervals. The frequency of inspections depends on the type of media being processed, because some powders tend to cause blockages more readily than others. The controller 160—optionally through user interaction with a user interface, such as an HMI—may be configured to monitor and/or indicate a screen service interval for general use, and the interval may be user settable.

The sieve system 100 may additionally or alternatively be configured to provide an automatic indication of a blocked or partially blocked sieve. In one example, if the second fines rate is determined still to be b) equal to or lower than the fines rate low set point, then it may be determined that the excess of powder on the sieve has not been addressed, or sufficiently addressed, by the oversize removal procedure. Accordingly, when the second fines rate is determined still to be b) equal to or lower than the fines rate low set point, the controller 160 may update the operating condition to be representative, or further representative, of a blocked, or at least partially blocked, sieve. In response to the determination of a blocked, or at least partially blocked, sieve, the controller 160 may stop operation of the sieve system 100. The sieve screen may then be inspected and cleaned or de-blinded, and/or repaired. In some cases, the sieve screen may need to be fully replaced.

Given the disruptive nature of stopping the sieve system 100 during the processing of a batch of powder, in some examples, the controller 160 is configured to repeat the oversize removal procedure of step 816 one or two or more times before updating the operating condition to be representative, or further representative, of a blocked, or at least partially blocked, sieve. This may help to ensure that a sufficient opportunity is provided to clear out a large build-up of second particles of oversize material on the sieve before it is determined that the cause of the slow fill rate in the fines container 150 is from blinding of the sieve screen.

Figure 3:
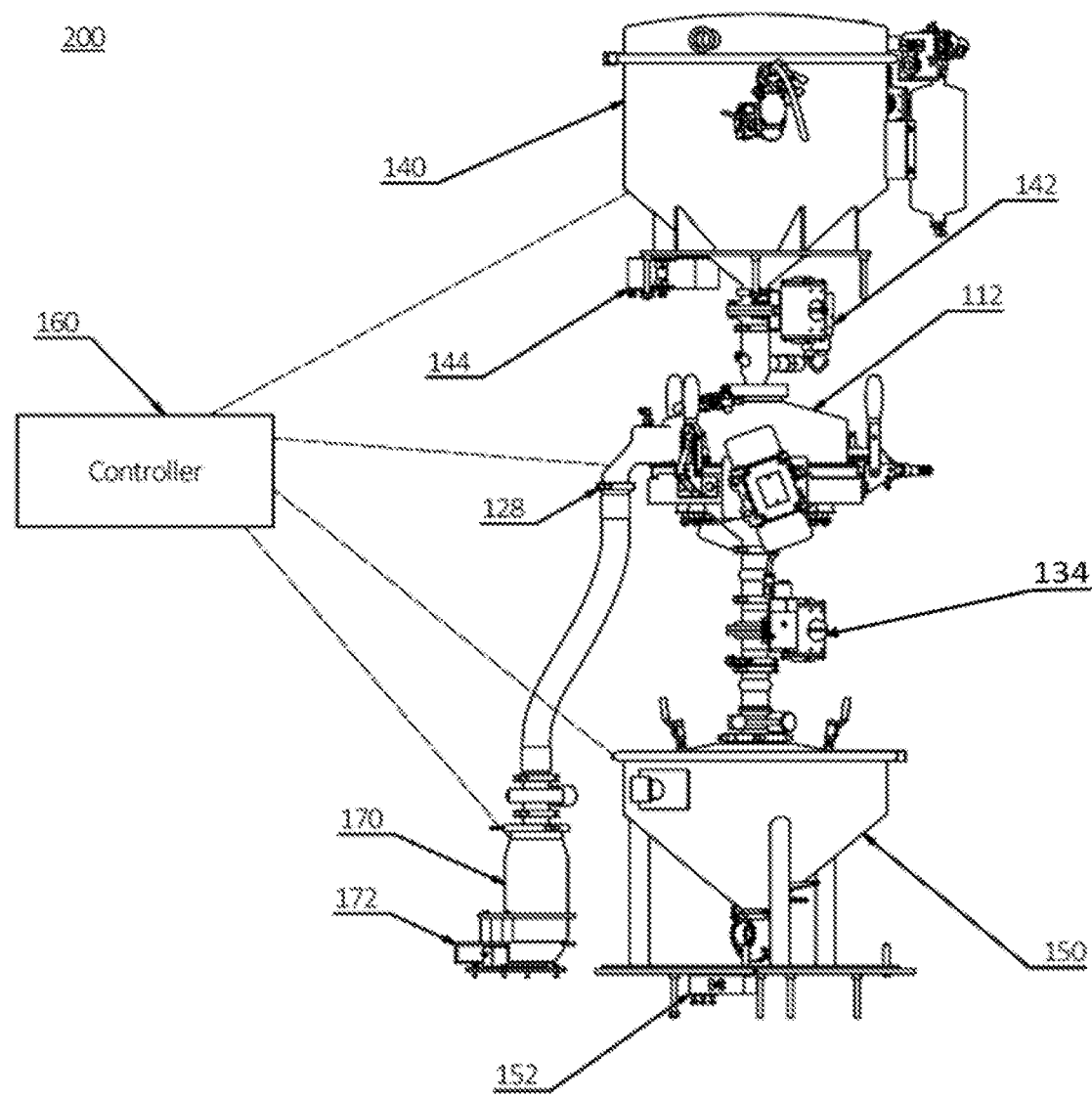
FIG. 3 shows schematically a sieve system further including an oversize container in accordance with one or more embodiments of the disclosure.

Referring to FIG. 3, there is shown a sieve system 200 for screening powder in accordance with one or more embodiments. The sieve system 200 is similar to the sieve system 100, so a repeat discussion of the corresponding components is not provided. It is to be understood, though, that the features, methods, characteristics, and effects of the sieve system 100 may be applied correspondingly to the sieve system 200. This includes modifications and variations discussed above or below. In this vein, it will be appreciated that like reference numerals have been used for like components in FIG. 3.

The sieve system 200, shown in FIG. 3, further includes a feed load sensor 144, an oversize container 170, and an oversize load sensor 172. In some examples, however, the system 200 may be provided without the oversize container 170 and/or the oversize load sensor 172. In still other examples, the system 200 may be provided without the feed load sensor 144.

The feed load sensor 144 is coupled to the feed container 140 and is configured to measure loading of the feed container in the form of a feed container load. The feed load sensor 144 may be provided by a load cell. In the example shown in FIG. 3, the feed container 140 is mounted on the load sensor 144 so that loading of the feed container may be measured. The feed load sensor 144 may take a number of forms, including a single point load cell or a platform load cell. In one arrangement, the feed container 140 may be suspended from the feed load sensor 144. The arrangement may be vibration isolated from the surrounding components of the system. The feed container 144 loading may thereby be measured.

The oversize container 170 is coupled to the oversize discharge outlet 128 and is configured to receive second particles of oversize material from the sieve via the oversize discharge outlet.

The oversize load sensor 172 is coupled to the oversize container 170 and is configured to measure loading of the oversize container in the form of an oversize container load. The oversize load sensor 172 may be provided by a load cell. In the example shown in FIG. 3, the oversize container 170 is mounted on the load sensor 172 so that loading of the oversize container may be measured. The oversize load sensor 172 may take a number of forms, including a single point load cell or a platform load cell. In one arrangement, a platform is mounted on the oversize load sensor 172. The arrangement may be vibration isolated from the surrounding components of the system. The oversize container 170 is mounted on the platform so that its loading may be measured.

The controller 160 is communicatively coupled with the oversize container 170, including the oversize load sensor 172.

In examples of the sieve system 200 in which a feed load sensor 144 is provided, the sieve system may be configured to monitor the rate of feeding powder to be screened to the sieve 112. In one example, the controller 160 is configured to measure a first feed container load at a fifth time. The controller 160 is further configured to measure a second feed container load at a sixth time. During the fifth to sixth times, any feed valve 142 provided between the feed container and the sieve is controlled to be open. Based on the measured first and second feed container loads and the fifth and sixth times, the controller 160 is configured to determine a rate of change of the feed container load and thereby a feed rate. If the determined feed rate is equal to or lower than a feed rate low set point, the controller 160 is configured to determine a feed blockage, or at least a partial feed blockage, from the feed container to the sieve. The controller 160 may be configured to stop operation of the sieve system for inspection for and clearance of any blockage in the feed system. Additionally or alternatively, in examples in which a pneumatic hammer is provided in the coupling between the feed container 140 and the sieve 112, the hammer may be activated or intensified to assist in dislodging and/or breaking up any blockage within the coupling.

In examples of the sieve system 200 in which an oversize container 170 and an oversize load sensor 172 are provided, the sieve system may be configured to monitor whether the oversize discharge outlet gate—for example, provided by an inflatable and deflatable seal, or by a mechanical valve—is operating correctly. In one example, the controller 160 is configured to measure a first oversize container load at a seventh time. The controller 160 is further configured to measure a second oversize container load at an eighth time. The period between the seventh and eighth times does not include operation of the sieve system to discharge powder to the oversize discharge outlet for removing the second particles from the sieve. The controller 160 is configured to determine whether there has been an increase in the oversize container load based on the measured first and second oversize container loads. In response to determining an increase in the oversize container load, the controller 160 is configured to determine a fault condition with the oversize discharge outlet; in particular, the oversize discharge outlet gate. That is, although the sieve system has not operated the gate to discharge oversize material, oversize material is nevertheless able to pass out of the oversize discharge outlet and into the oversize container, indicating a faulty gate.

With an open discharge pathway between the feed container 140 and the sieve 112—for example, by opening a feed valve 142—the feed rate is dependent on the flow characteristics of the powder to be screened and on the feed nozzle aperture or size. Different nozzle sizes may be used, but this still only provides a relatively coarse method for controlling the feed rate. Overloading a sieve screen can cause premature failure, sieve system fatigue, and/or accelerated blocking of the screening apertures of the sieve screen.

With the sieve system 200 shown in FIG. 3, the feeding of powder to the sieve 112 may be monitored and controlled in a more precise way. A sieve load low set point and a sieve load high set point may be pre-determined and used to control the loading of powder to be screened on the sieve 112. In one example method, the controller 160 is configured to measure a third feed container load, a fifth fines container load, and a third oversize container load at a ninth time. The controller 160 is further configured to measure a fourth feed container load, a sixth fines container load, and a fourth oversize container load at a tenth time. The controller 160 is configured to determine a sieve load based on a difference between a) a decrease in the feed container load between the ninth and tenth times, and b) a sum of an increase in the fines container load and an increase in the oversize container load between the ninth and tenth times. That is, the sieve load is effectively calculated based on the mass of powder fed from the feed container 140 (for example, the difference between a starting feed load and a subsequent feed load, which subsequent load should be lower) minus the mass of screened powder received in the fines container 150 (for example, the difference between a subsequent fines load and a starting fines load, which starting load should be lower) and further minus the mass of screened powder received in the oversize container 170 (for example, the difference between a subsequent oversize load and a starting oversize load, which starting load should be lower).

If the controller 160 determines that the sieve load is equal to or lower than a sieve load low set point, the controller determines the operating condition to be representative, or further representative, of an underloading of powder on the sieve. As a result, a feed valve 142 between the feed container and the sieve may be opened, or kept open for a longer period of time, to increase the loading on the sieve. In some arrangements, the feed valve 142 may be opened until the sieve load high set point is reached, at which point the feed valve may be closed. The feed valve may remain closed until the sieve load low set point is again reached, at which point the feed valve may once again be opened.

In some arrangements, the feed valve may be provided by a valve that may control the rate of feeding of material through the valve. In this way, operating positions in addition to closed and open may be provided. Such additional positions may include one or more of a half-open or mid-point position, a quarter-open position, and a three-quarters-open position, among others. Such a valve may be provided by a rotary valve or a proportional valve, for example. In these arrangements, when the controller determines that the sieve load is equal to or lower than a sieve load low set point, the variable feed valve may be opened, or, if already open, opened to a greater extent. In this case, provided the sieve load passes back above the sieve load low set point, and does not go above the sieve load high set point, the feed valve may remain open at that particular position.

If the controller 160 determines that the sieve load is equal to or greater than a sieve load high set point, the controller determines the operating condition to be representative, or further representative, of an overloading of powder on the sieve. As a result, a feed valve 142 between the feed container and the sieve may be closed—for example, temporarily closed out of sequence—to reduce the loading on the sieve. In some arrangements, the feed valve 142 may be closed until the sieve load low set point is reached, at which point the feed valve may be opened. The feed valve may remain open until the sieve load high set point is again reached, at which point the feed valve may once again be closed.

In arrangements in which the feed valve is provided by a valve that may control the rate of feeding of material through the valve, when the controller determines that the sieve load is equal to or greater than a sieve load high set point, the variable feed valve may be opened to a lesser extent or (fully) closed. In the case of opening to a lesser extent, provided the sieve load passes back below the sieve load high set point, and does not reach the sieve load low set point, the feed valve may remain open at that particular position.

It will be appreciated that the effect of the above considerations is to keep the sieve load during operation between the sieve load low and high set points, for acceptable, desired, or in some cases optimum, performance of the sieve system.

In some examples, the feed container 140 may be monitored not only with a feed load sensor 144, but also with a high-level sensor (not shown). The high-level sensor is configured to provide an indication to the controller 160 when the level of powder in the feed container 140 has reached a pre-determined maximum allowable or desirable level or height when powder to be screened is supplied or conveyed into the feed container. Other level sensors may additionally or alternatively be provided. For example, one or more of a low-level sensor and an intermediate-level sensor may additionally or alternatively be provided.

As discussed above, in some examples, the sieve load may be determined by calculating the differences between the loads of the three vessels—the feed container 140, the fines container 150, and the oversize container 170—for example, at the point the screening process starts and then at a subsequent point. The feed mass or feed load reduction determined for the feed container 140 represents powder that has been fed to the sieve 112. The screened mass or screened load increase determined for the fines container 150 and the oversize container 170 represents first particles or fines that have passed into the fines container and second particles or oversize material that have passed into the oversize container, respectively. The sieve load is the difference between the feed load reduction and the screened load increase at any given time. Put another way:

$$L_{sieve}(t_n)=[L_{feed}(t_0)-L_{feed}(t_n)]-[\{L_{fines}(t_n)-L_{fines}(t_0)\}+\{L_{oversize}(t_n)-L_{oversize}(t_0)\}]$$

where
Lsieve(tn)=sieve load at time tn
Lfeed(t0)=feed container load at start time, t0
Lfeed(tn)=feed container load at time tn
Lfines(tn)=fines container load at time tn
Lfines(t0)=fines container load at start time, t0
Loversize(tn)=oversize container load at time tn
Loversize(t0)=oversize container load at start time, t0

As discussed above, in some examples, the rate at which powder is screened and received into the fines container 150 may be determined by the sieve system and used to identify one or more operating conditions of the system. The fines rate may be calculated from the difference in the fines container load taken at two different times divided by the time interval between those times. Put another way:

$$Rfines=[Lfines(tn)-Lfines(tm)]/[tn-tm]$$

where
Rfines=fines rate
Lfines(tn)=fines container load at time tn
Lfines(tm)=fines container load at earlier time, tm Similarly, in some examples, the rate at which powder is fed from the feed container 140 may be determined by the sieve system and used to identify one or more operating conditions of the system. The feed rate may be calculated from the difference in the feed container load taken at two different times divided by the time interval between those times. Put another way:

$$Rfeed=[Lfeed(tm)-Lfeed(tn)]/[tn-tm]$$

where
Rfeed=feed rate
Lfeed(tn)=feed container load at time tn
Lfeed(tm)=feed container load at earlier time, tm As noted above, for a particular sieve system configuration and/or for a given powder to be screened (including whether the same powder type is new/virgin powder or recycled/reclaimed powder), the operating parameters may be set differently. For example, some powders may be able to be fed more quickly than others, some may be more likely to clog or clump and therefore need to be fed more slowly, some powders may be more dense than others so need to be fed more slowly to reduce wear or fatigue on the sieve system.

A calibration procedure may therefore be performed on the sieve system once configured and/or for each new powder type to be screened. It will be appreciated that some sieve systems may be intended to screen only one type of powder so that only one calibration procedure may be needed at the outset. Of course, regular updates to the calibration of a sieve system may be beneficial to ensure that characteristics of the sieve system and/or powder have not changed or drifted over time. The calibration procedure may be performed by running a batch of a particular powder to be screened, at a relatively low feed rate to begin with. Screening performance may be monitored manually and/or visually—for example, by visual inspection during processing and/or by stopping the sieve system and opening the sieve 112 assembly up to inspect the condition of the sieve screen for checking on whether there is an excess of powder on the sieve screen and/or whether the screening apertures of the sieve screen are becoming blocked or blinded—to determine that the sieve is not being overloaded or underloaded. The fines rate may also be monitored to determine an average rate and a general, acceptable working range for the fines rate.

Once the flow characteristics of a particular powder have been established—in particular, by establishing a base line fines rate—one or more set points, limits, conditions, and/or acceptable working ranges for one or more other parameters of the sieve system may be determined and programmed into the system, or they may be determined automatically by the controller 160. Once stored in the sieve system, the controller 160 may use the information to monitor and control operation of the sieve system; in particular, to monitor and control sequencing of the screening process and/or to determine fault conditions.

Among other parameters, during operation, the rate of feeding of the powder to be screened from the feed container 140 to the sieve 112, also referred to as the feed rate, may be controlled. Additionally or alternatively, the frequency and/or amplitude of vibration of the sieve with the one or more motors 122, optionally also with one or more ultrasonic actuators, may be controlled. Additionally or alternatively still, the intermittent discharging of the second particles of oversize material from the oversize discharge outlet 128 may be controlled. Additionally or alternatively still, the rate at which the fines container 150 receives the first particles of undersize material, also referred to as the fines rate, may be controlled. Set points for one or more of these parameters may be determined and/or set in a calibration procedure. Set points for one or more of the sieve load, the fines container load, the feed container load, and the oversize container load may also be determined and/or set.

Figure 12:
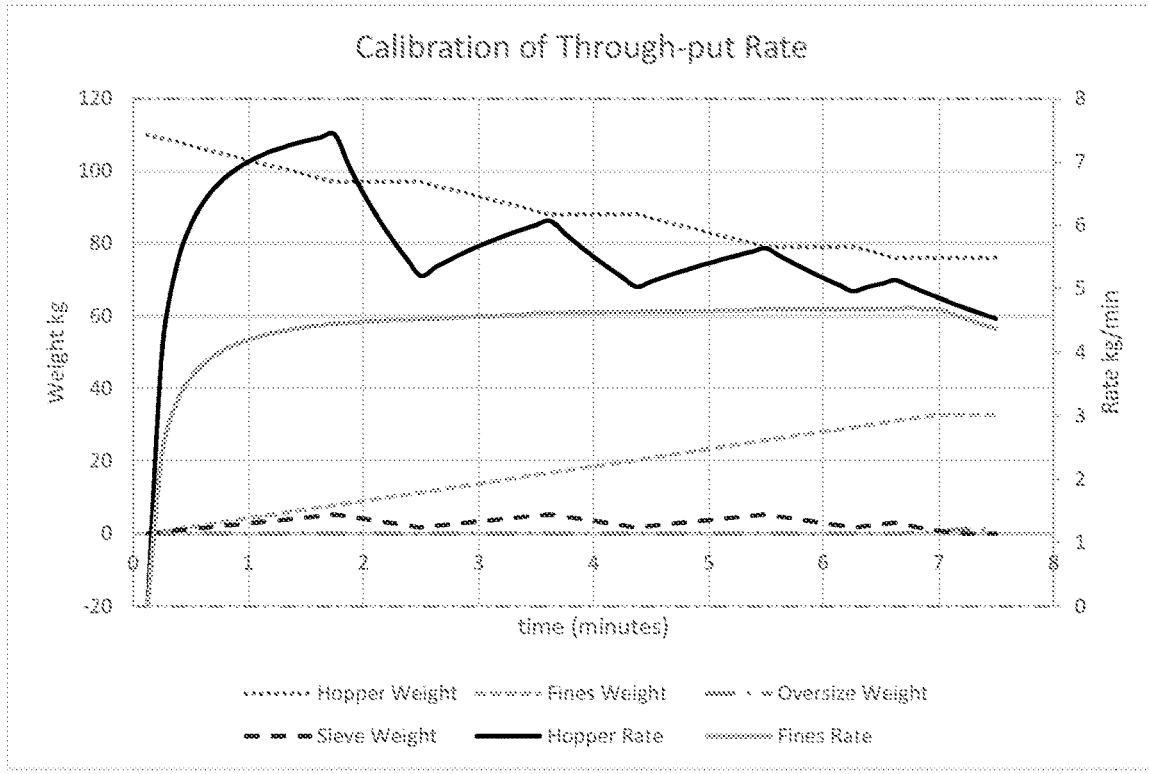
FIG. 12 shows graphs of variations in material loading or material transfer rate in various parts of a sieve system over time, for a calibration procedure, in accordance with one or more embodiments of the disclosure.

FIG. 12 shows a graph of an example calibration procedure. The left-hand vertical axis represents loading in kg. The right-hand vertical axis represents flow rate in kg/min. The horizontal axis represents time in minutes.

The dark, solid plot shows the feed rate, referred to in FIG. 12 as the hopper rate; that is, the rate of discharge of powder to be screened from the feed container 140 into the sieve 112. At the start of the procedure, the feed container 140 is activated to discharge powder, so the rate increases. Once an initial load of powder has been discharged into the sieve 112, the feed rate is reduced. This may be effected by reducing the size of the opening of the feed valve 142, or by closing the valve for a period of time. Thereafter, the feed rate is intermittently increased to feed more powder to the sieve and then reduced again to allow screening to take place without overloading the sieve. It can be seen that the feed rate in this example rises to around 110-120 kg/min initially. The feed rate during ongoing processing rises and falls between around up to 90-100 kg/min and down to around 70-80 kg/min.

In some examples, estimated or approximated sieve load low and high set points may be pre-set and the opening and closing of the feed valve 142 may be controlled based on the low set point and high set point, respectively, being reached. In this way, the feed container supplies material to the sieve with an alternating positive and negative feed rate, rather than reaching a steady state for the feed.

The light, dotted plot shows the feed container load, referred to in FIG. 12 as the hopper weight. As can be seen, this plot tracks the feed rate plot, decreasing over time as powder is discharged from the feed container 140. It can be seen that the feed container load in this example starts at around 110-115 kg. The initial feeding of powder to the sieve discharges around 15-20 kg of powder. Thereafter, each further discharge cycle discharges around 10-15 kg of powder onto the sieve.

The dark, dashed plot shows the sieve load, referred to in FIG. 12 as the sieve weight. As can be seen, this plot generally shows that the sieve load increases each time the feed rate increases. When the feed rate is decreased, with ongoing screening of the powder by the sieve 112 meaning that first particles of undersize material pass through the sieve to the fines container 150, the sieve load decreases. This rise and fall in sieve load then generally follows the changes in feed rate. It can be seen that the sieve load in this example varies from 0 kg initially, to between around 2-3 kg and 4-5 kg during the screening procedure. Indeed, in this example, a sieve load low set point was set to 2 kg. A sieve load high set point was set to 5 kg. Of course, other low and high set points may be set. Once the sieve load low and high set points have been set, the feed container 140 may be activated to discharge powder or to slow or stop discharging powder in order to maintain the sieve load between the low and high set points.

The light, solid plot shows the fines rate. As can be seen, this plot rises quickly once powder is fed to the sieve 112 as the feed rate rises. After an initial period, the sieve system approaches and generally maintains a steady state of feeding powder, screening powder, and receiving screened powder into the fines container 150. It will be understood that the steady state may be disrupted by one or more fault conditions occurring. It can be seen that the fines rate in this example reaches an average of around 4.5 kg/min.

The light, dashed plot shows the fines container load, referred to in FIG. 12 as the fines weight. As can be seen, with a generally steady operation of the sieve system, the fines container load increases steadily over time. It can be seen that the fines container load in this example rises from 0 kg initially to around 30-35 kg after a 7-minute runtime.

The light, dot-dash plot shows the oversize container load, referred to in FIG. 12 as the oversize weight. As can be seen, in this example, the oversize container load remains at 0 kg over the duration of the screening procedure up to around 7 minutes. During this time, the oversize discharge outlet is gated shut so that no matter may be discharged into the oversize discharge container 170. Towards the end of the screening procedure, when the majority of first particles of undersize material is expected to have passed into the fines container 150, the oversize discharge outlet 128 may be gated open to allow second particles of oversize material to be removed from the sieve and into the oversize discharge container 170. It can be seen that the oversize container load in this example rises from 0 kg to around 1-3 kg.

By setting low and high set points for the sieve load, and monitoring the screening procedure—in particular, determining an average fines rate and working range around the average value—other parameters may have conditions, low and/or high set points, or other trigger values set. This setting may be performed manually by a user, or automatically by the controller 160. The automatic setting by the controller 160 may be based on pre-stored values or ranges for identical or similar configurations and/or powder types.

The calibration procedure for a given sieve system configuration and/or powder type may be performed and the results and determined set points, values, conditions, etc. stored in the system for subsequent use. In this way, it is not necessary to perform a calibration procedure at the start of each new batch or each time the sieve system is switched on. Alternatively, the calibration procedure may be performed for each new batch of powder to be processed, or each time the sieve system is switched on.

In one or more arrangements, calibration information, such as operational parameters and/or settings, may be stored by the controller 160 after a calibration procedure has been performed by the sieve system. If the calibration information has been previously determined, either from the same sieve system or from another, similarly configured sieve system, or by using reference tables and/or values, the calibration information may be manually input into and stored by the sieve system, in particular, using a user interface. Alternatively or additionally, calibration information may be loaded into the controller by transferring the information from an external memory or an external data source, such as via a memory stick, a removable data-carrying device, a wired connection to the controller, a wireless connection to the controller, or one or more combinations thereof.

During operation of the sieve systems disclosed herein, the controller may be configured to monitor and control the operation. In one or more arrangements, the controller may log or store operational information related to the operation of the sieve system; for example, operational parameters, measured and/or determined values, conditions, timings, fault indications, remedial procedures undertaken to address fault indications, and the like. The operational information may then be transferred from memory associated with the controller to a location external to the sieve system, such as to an external memory or external data storage, for example via a memory stick, a removable data-carrying device, a wired connection to a remote computing device, a wireless connection to a remote computing device, or one or more combinations thereof. In this way, the operational information may be analysed. Such analysis may allow for refined or improved process control, or adjusted calibration, of the sieve system by the controller by taking into account the operational information from one or more earlier operations of the sieve system. Additionally or alternatively, the operational information may be reviewed or used to validate the screening process for quality control assurance.

Figure 13:
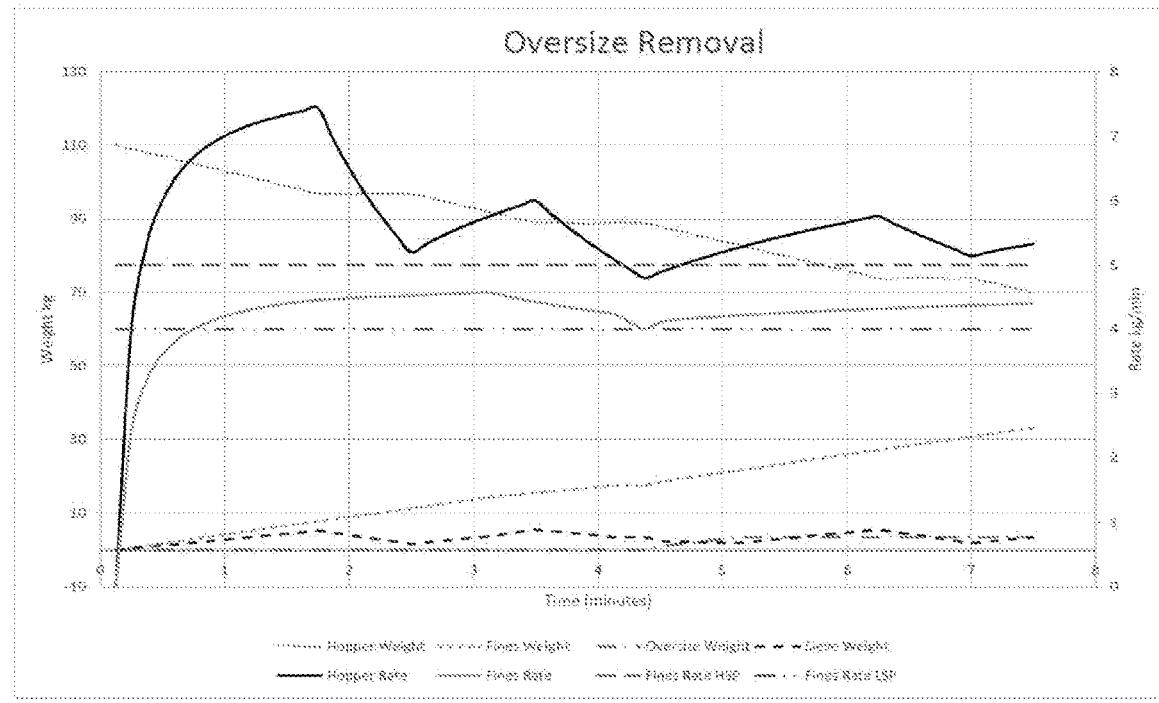
FIG. 13 shows graphs of variations in material loading or material transfer rate in various parts of a sieve system over time, for excess oversize powder detection, in accordance with one or more embodiments of the disclosure.

FIG. 13 shows an example of a procedure for detecting an excess of powder on the sieve 112 and for providing an excess powder removal step. Details in FIG. 13, which are similar to those in FIG. 12, will not be repeated here, but it will be understood that the information applies correspondingly. FIG. 13 shows a fines rate high set point (HSP), represented by a medium, long-dashed plot. FIG. 13 also shows a fines rate low set point (LSP), represented by a medium, double-dot-dash plot. In this example, the fines rate HSP is set at 5 kg/min. In this example, the fines rate LSP is set at 4 kg/min.

As noted during the calibration procedure, for this example, the average fines rate is around 4.5 kg/min. Thus, the fines rate dropping to 4 kg/min or lower would be indicative of a fault condition with the sieve, such as a build-up of oversize material on the sieve and/or blocking of a number of screening apertures of the sieve screen. FIG. 13 shows that the fines rate falls to the fines rate LSP (in this example, the rate begins to fall just after 3 minutes and reaches the LSP at around 4.5 minutes). In response, the controller 160 activates the oversize discharge outlet gate to open (for example, by deflating a pneumatic seal) to remove oversize particles from the sieve. This activation is performed out of sequence, earlier than would otherwise have been performed, in view of the falling fines rate. As can be seen, following the excess removal procedure, the fines rate begins to rise again, recovering back towards the average operational value.

Figure 14:
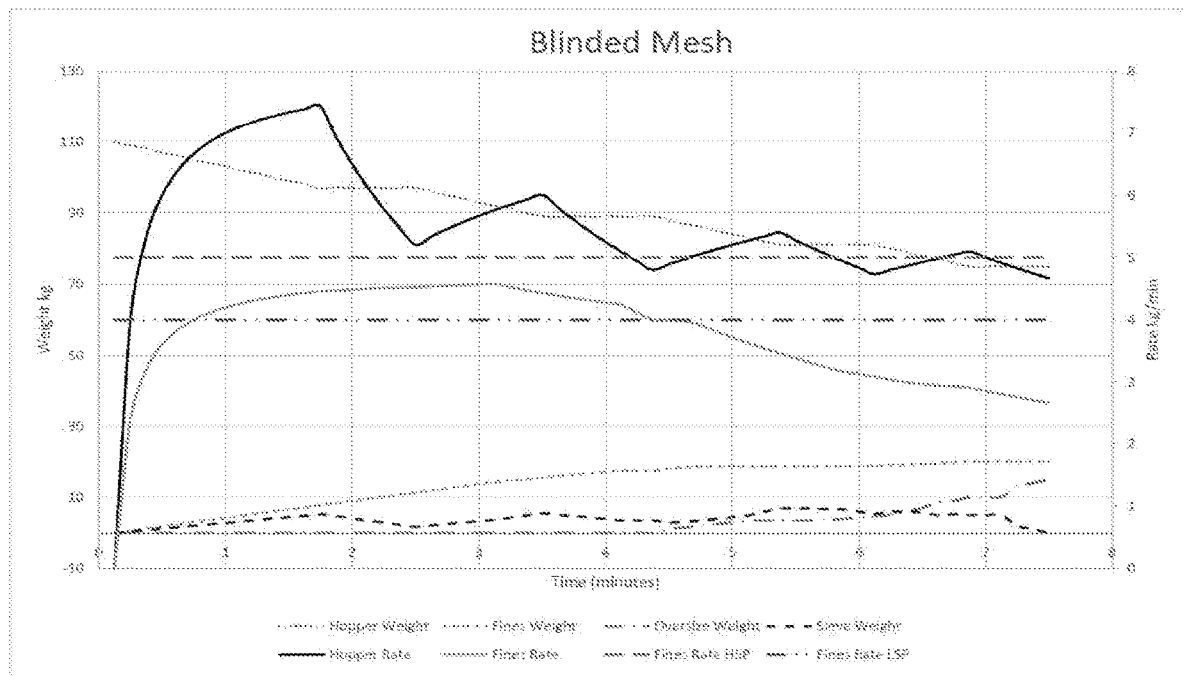
FIG. 14 shows graphs of variations in material loading or material transfer rate in various parts of a sieve system over time, for detecting blockages in a sieve, in accordance with one or more embodiments of the disclosure.

FIG. 14 shows an example of a procedure for determining a blocked or partially blocked sieve screen. Details in FIG. 14, which are similar to those in FIGS. 12 and 13, will not be repeated here, but it will be understood that the information applies correspondingly. FIG. 14 shows the fines rate fall towards the fines rate LSP. As for FIG. 13, the controller 160 activates an excess removal procedure, on the basis that an initial diagnosis in this situation is of an excess of powder being on the sieve due to a build-up of second particles of oversize material. However, although the oversize container load rises as a result of this excess removal procedure, the fines rate continues to fall. One or two or more further excess removal procedures may be performed, to ensure that the problem is not simply a very large build-up of second, oversize particles. Because the fines rate does not recover with the one or more excess removal procedures, the controller 160 determines that the fault condition is possibly a blocked or partially blocked sieve screen. The controller 160 may then provide a suitable indication and/or alarm and in some cases may stop the screening process for user inspection.

Figure 15:
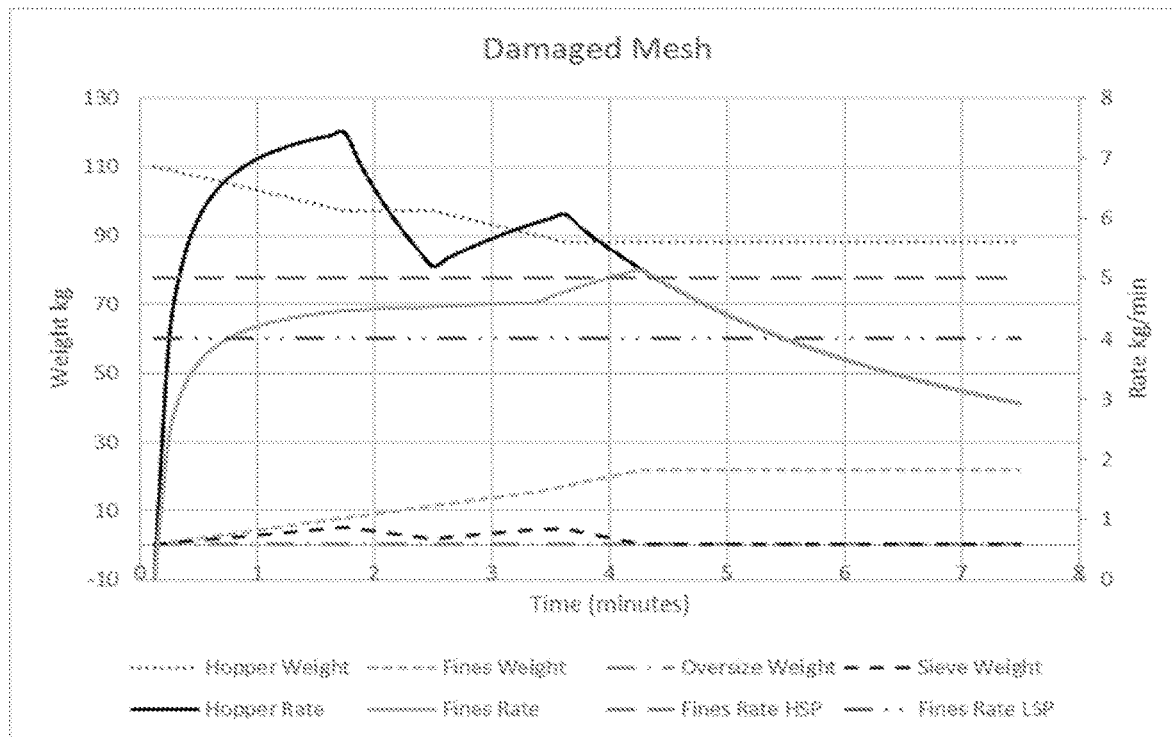
FIG. 15 shows graphs of variations in material loading or material transfer rate in various parts of a sieve system over time, for detecting damage to a sieve, in accordance with one or more embodiments of the disclosure.

FIG. 15 shows an example of a procedure for determining a damaged or missing sieve. Details in FIG. 15, which are similar to those in FIGS. 12-14, will not be repeated here, but it will be understood that the information applies correspondingly. FIG. 15 shows normal operation of the sieve system in this example, up to just before 3.5 minutes. It can be seen that, having reached a steady, average fines rate, the fines rate then rises up to and beyond the fines rate HSP. Because reaching the fines rate HSP is representative of a damaged sieve—in particular, through a tear or hole in the sieve screen—or a missing sieve, once this has been detected, the controller 160 automatically shuts down the screening process. This is to prevent further damage to the sieve and/or other components of the sieve system, and to provide the best chance of not needing to discard, or re-screen, the entire contents of the fines container, which may otherwise receive undesirable foreign objects, such as fragments of the damaged sieve and/or oversize material that is able to pass through the tear or hole.

Figure 4:
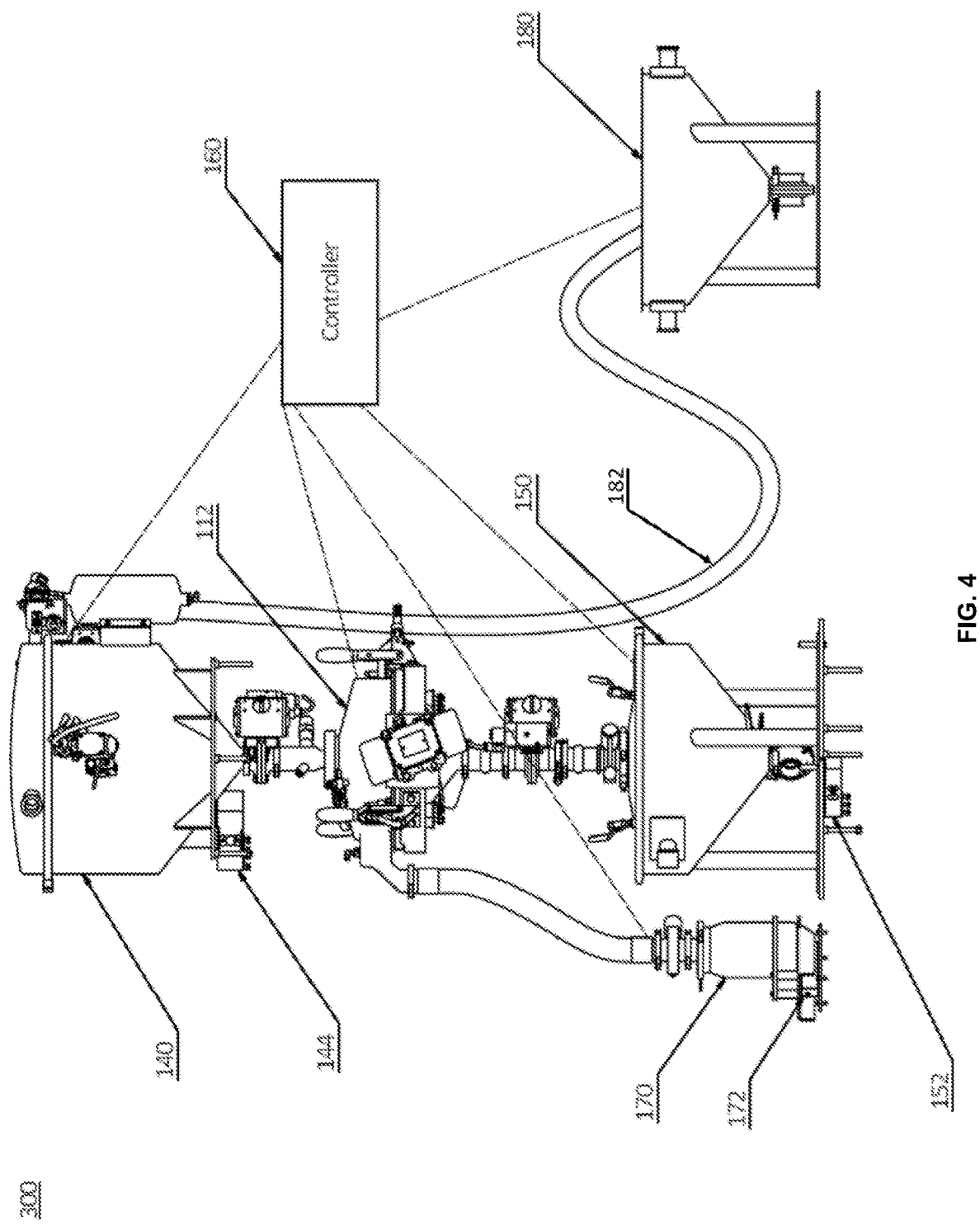
FIG. 4 shows schematically a sieve system further including a powder supply container in accordance with one or more embodiments of the disclosure.

Referring to FIG. 4, there is shown a sieve system 300 for screening powder in accordance with one or more embodiments. The sieve system 300 is similar to the sieve systems 100, 200, so a repeat discussion of the corresponding components is not provided. It is to be understood, though, that the features, methods, characteristics, and effects of the sieve systems 100, 200 may be applied correspondingly to the sieve system 300. This includes modifications and variations discussed above or below. In this vein, it will be appreciated that like reference numerals have been used for like components in FIG. 4.

The sieve system 300, shown in FIG. 4, further includes a supply container 180 for supplying powder to be screened to the feed container 140. The powder to be screened may be virgin powder, or recycled powder that has been reclaimed as a by-product, left-over product, or waste product from another powder processing procedure.

The sieve system 300 also includes a powder conveyance system 182 for conveying the powder to be screened from the supply container 180 to the feed container 140. The powder conveyance system 182 may operate under reduced pressure or vacuum suction to draw powder from the supply container 180 to the feed container 140. The controller 160 is communicatively coupled with the supply container 180 and the powder conveyance system 182.

In this way, the supply container 180, also referred to as a feed bin, may be integrated into the system loop and the process of conveying powder to be screened to the feed container 140 may be automated. One or more timers may be set and the controller 160 may be configured to start and stop the powder conveyance system 182 at pre-determined intervals. Alternatively or additionally, the controller 160 may be configured to start and stop the powder conveyance system 182 when the feed container 140 reaches predetermined feed container load low or high set points.

During operation of the powder conveyance system 182, the rate of conveyance of the powder to the feed container 140 may be monitored. This may be by measuring a rate of change of the feed container load during the powder conveyance procedure. Alternatively or additionally, this may be performed by providing a supply load sensor on the supply container 180 to monitor a change of load of the supply container during the powder conveyance procedure. Either way, if the rate of conveyance falls to or below a low set point, this may indicate that the supply container 180 is empty or that there is a blockage or impediment in the powder conveyance system 182.

In one example, the controller 160 is configured to operate a powder conveyance system 182 to convey powder to be screened from a supply container 180 to the feed container 140. The controller 160 is further configured to measure a fifth feed container load at an eleventh time. The controller 160 is further configured to measure a sixth feed container load at a twelfth time. The eleventh and twelfth times are during the operation of the powder conveyance system to convey powder to the feed container. The controller 160 is further configured to determine a conveyance rate by determining a rate of change of the feed container load based on the measured fifth and sixth feed container loads and the eleventh and twelfth times. The controller 160 is further configured to determine a powder conveyance system blockage or at least a partial powder conveyance system blockage, and/or that the supply container is empty or substantially empty, when the determined conveyance rate is equal to or lower than a conveyance rate low set point.

When the powder conveyance system 182 operates without a fault condition—such as an empty supply container 180 or a blockage or impediment in the system—the feed container 140 receives powder from the powder conveyance system until the feed container load reaches a high set point and/or a high-level sensor, if provided, indicates that the powder has reached a pre-determined level in the feed container 140. This helps to prevent the feed container 140 from being overloaded and/or overfilled.

Figure 5:
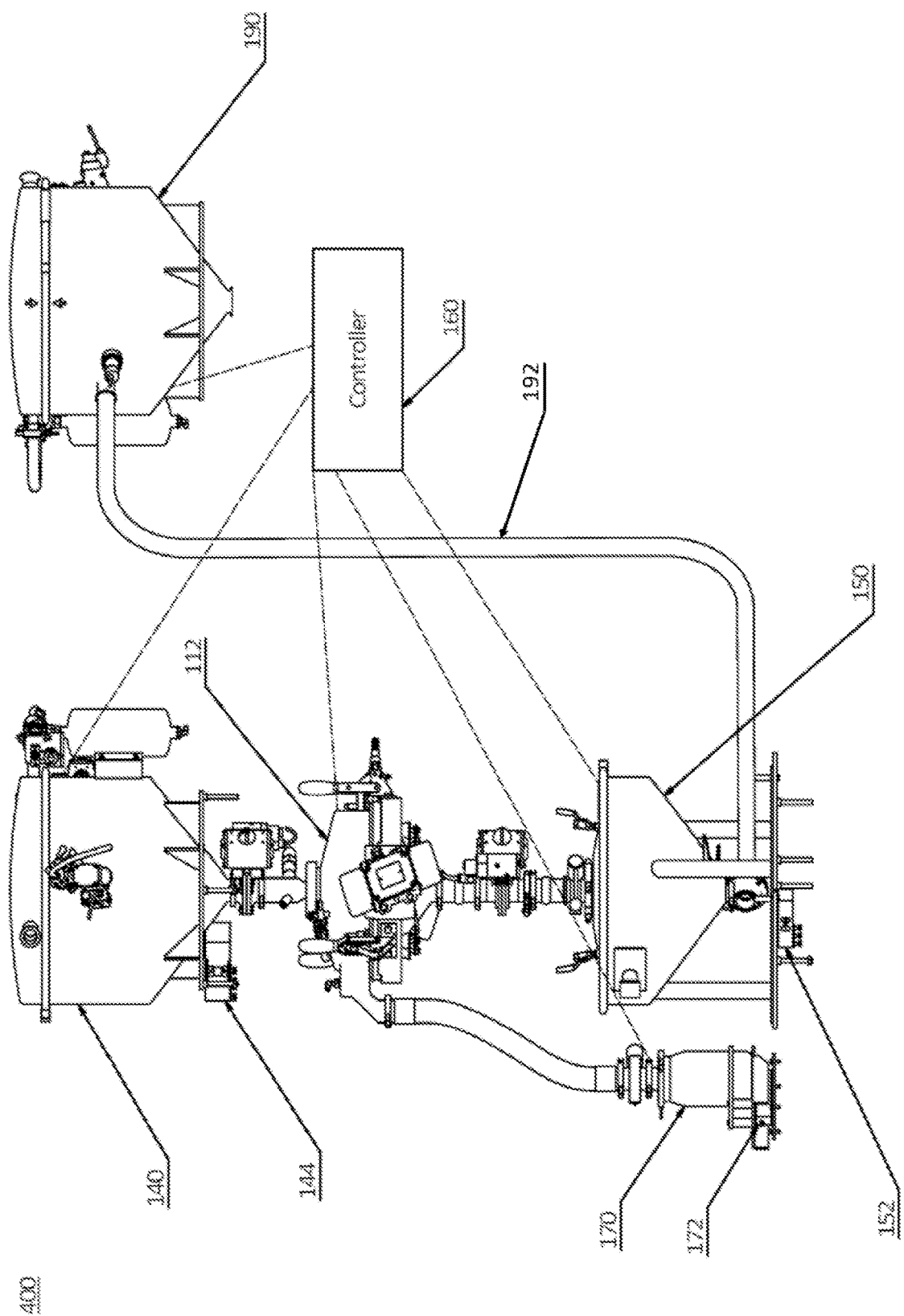
FIG. 5 shows schematically a sieve system coupled to a feed input of an additive manufacturing system in accordance with one or more embodiments of the disclosure.

Referring to FIG. 5, there is shown a sieve system 400 for screening powder in accordance with one or more embodiments. The sieve system 400 is similar to the sieve systems 100, 200, 300, so a repeat discussion of the corresponding components is not provided. It is to be understood, though, that the features, methods, characteristics, and effects of the sieve systems 100, 200, 300 may be applied correspondingly to the sieve system 400. This includes modifications and variations discussed above or below. In this vein, it will be appreciated that like reference numerals have been used for like components in FIG. 5.

The sieve system 400, shown in FIG. 5, further includes a screened powder feed container 190. The screened powder feed container 190 is configured to receive screened powder, or fines, from the fines container 150. A powder conveyance system 192 couples the screened powder feed container 190 with the fines container 150 and is configured to convey the screened powder from the fines container 150 to the screened powder feed container 190. The powder conveyance system 192 may operate under reduced pressure or vacuum suction to draw powder from the fines container 150 to the screened powder feed container 190. The controller 160 is communicatively coupled with the screened powder feed container 190 and the powder conveyance system 192.

In this way, the screened powder feed container 190, may be integrated into the system loop and the process of conveying screened powder to the screened powder feed container 190 may be automated. One or more timers may be set and the controller 160 may be configured to start and stop the powder conveyance system 192 at pre-determined intervals. Alternatively or additionally, the controller 160 may be configured to start and stop the powder conveyance system 192 when the screened powder feed container 190 reaches pre-determined container load low or high set points.

The system of FIG. 5 is particularly suited for coupling to an additive manufacturing system. The screened powder feed container 190 may be coupled to a build chamber of an additive manufacturing system for supplying a screened powder suitable for use in an additive manufacturing, or 3D printing, process.

Figure 6:
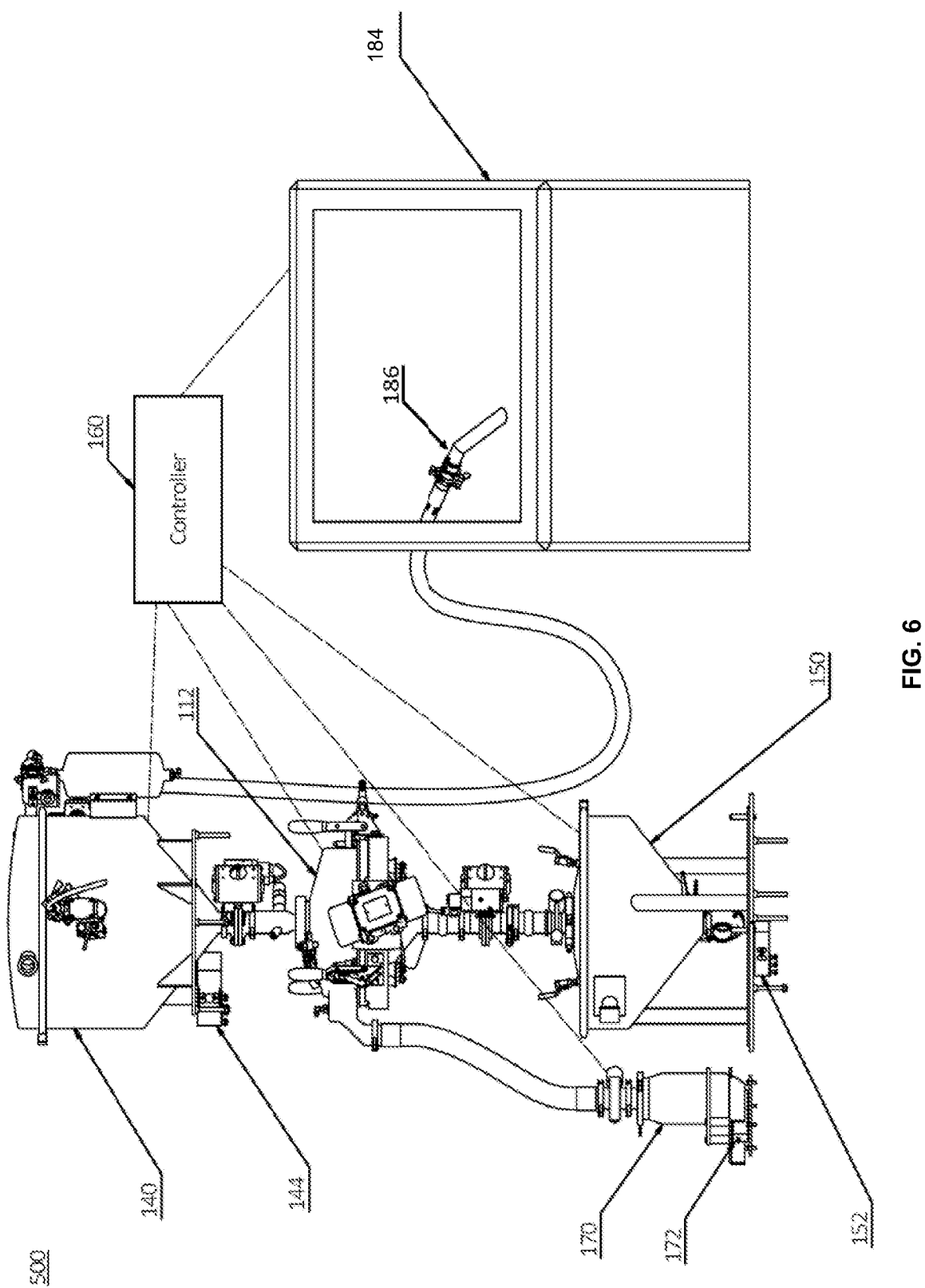
FIG. 6 shows schematically a sieve system with the feed hopper coupled to a build chamber of an additive manufacturing system in accordance with one or more embodiments of the disclosure.

Referring to FIG. 6, there is shown a sieve system 500 for screening powder in accordance with one or more embodiments. The sieve system 500 is similar to the sieve systems 100, 200, 300, 400, in particular sieve system 300, so a repeat discussion of the corresponding components is not provided. It is to be understood, though, that the features, methods, characteristics, and effects of the sieve systems 100, 200, 300, 400 may be applied correspondingly to the sieve system 500. This includes modifications and variations discussed above or below. In this vein, it will be appreciated that like reference numerals have been used for like components in FIG. 6.

The sieve system 500, shown in FIG. 6, includes a powder reclaim system 186 for collecting unused or leftover powder from a build chamber 184 of an additive manufacturing system. Powder that has not been heated, fused, or otherwise combined with other components of a 3D printed object may be reclaimed. The reclaimed powder may then be screened, or re-screened, for possible re-use in the additive manufacturing system, or for another purpose. The powder reclaim system 186 is configured to supply the reclaimed powder to the feed container 140.

The powder reclaim system 186 may operate under reduced pressure or vacuum suction to draw reclaimed powder from the build chamber 184 to the feed container 140. The controller 160 is communicatively coupled with the powder reclaim system 186.

In this way, unused powder may be recovered from the build chamber 184 of an additive manufacturing system and fed to the feed container 140 of the sieve system 500. Any of the reclaimed powder that passes through the sieve system 500 and into the fines container 150 may then be used in a further 3D printing procedure or for another purpose.

Figure 7:
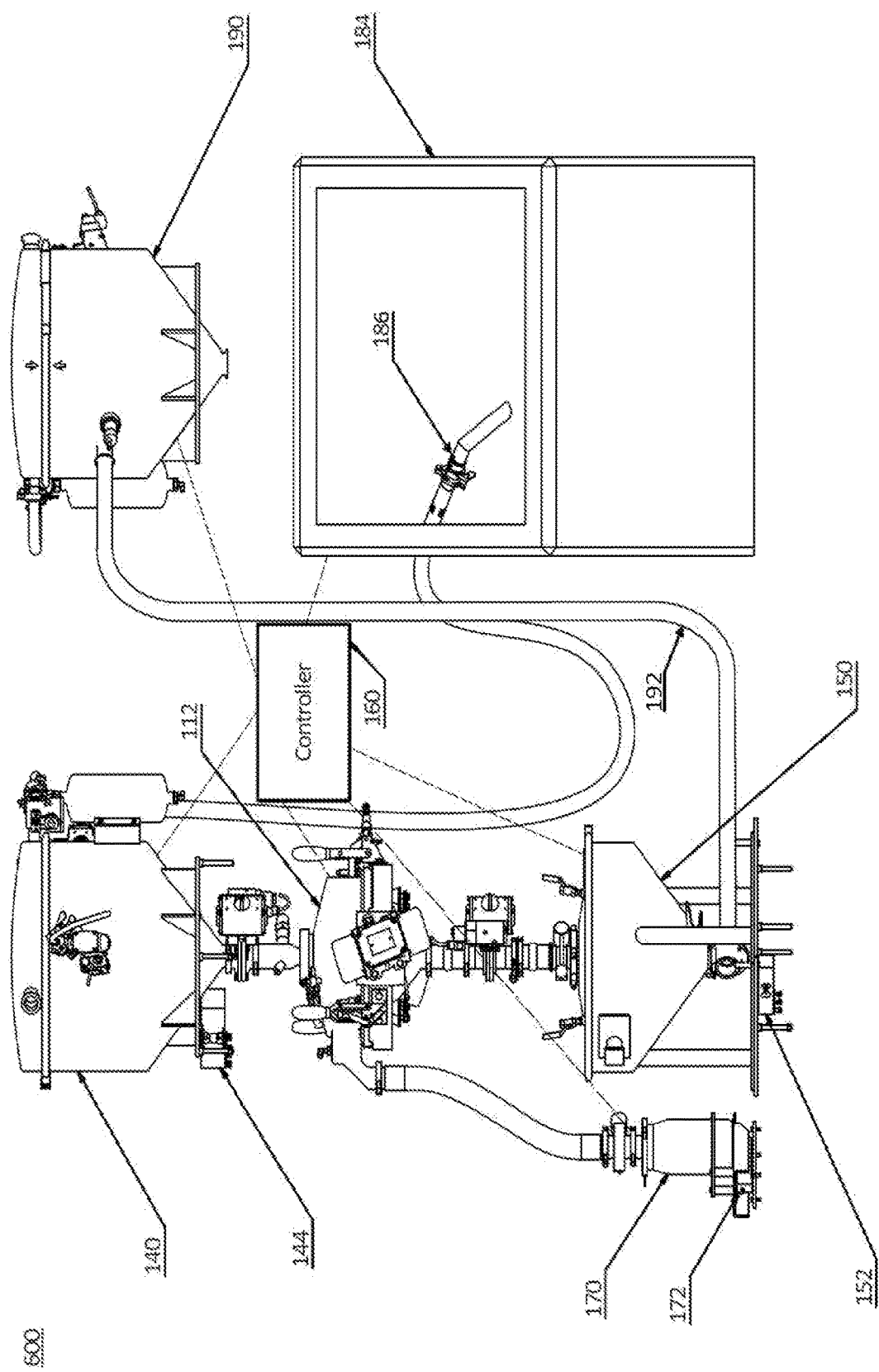
FIG. 7 shows schematically a sieve system coupled to a feed input of an additive manufacturing system and the feed hopper coupled to a build chamber of the additive manufacturing system in accordance with one or more embodiments of the disclosure.

Referring to FIG. 7, there is shown a sieve system 600 for screening powder in accordance with one or more embodiments. The sieve system 600 is a combination of sieve system 400 shown in FIG. 5 and sieve system 500 shown in FIG. 6. In this way, a 3D printing system may be provided with an additive manufacturing system having a screened powder feed container 190 coupled to the fines container 150, and a build chamber 184 coupled back to the feed container 140. The additive manufacturing system and the sieve system may thereby form a closed loop system. The controller 160 may be configured to control the operation of the sieve system 600 and interactions with the additive manufacturing system. It will be understood that a separate controller may be provided to control the operation of the additive manufacturing system. Such controllers may be communicatively coupled to exchange monitoring and control information relative to the sieve system and the additive manufacturing system so that the closed loop system may be appropriately monitored and controlled.

Figure 16:
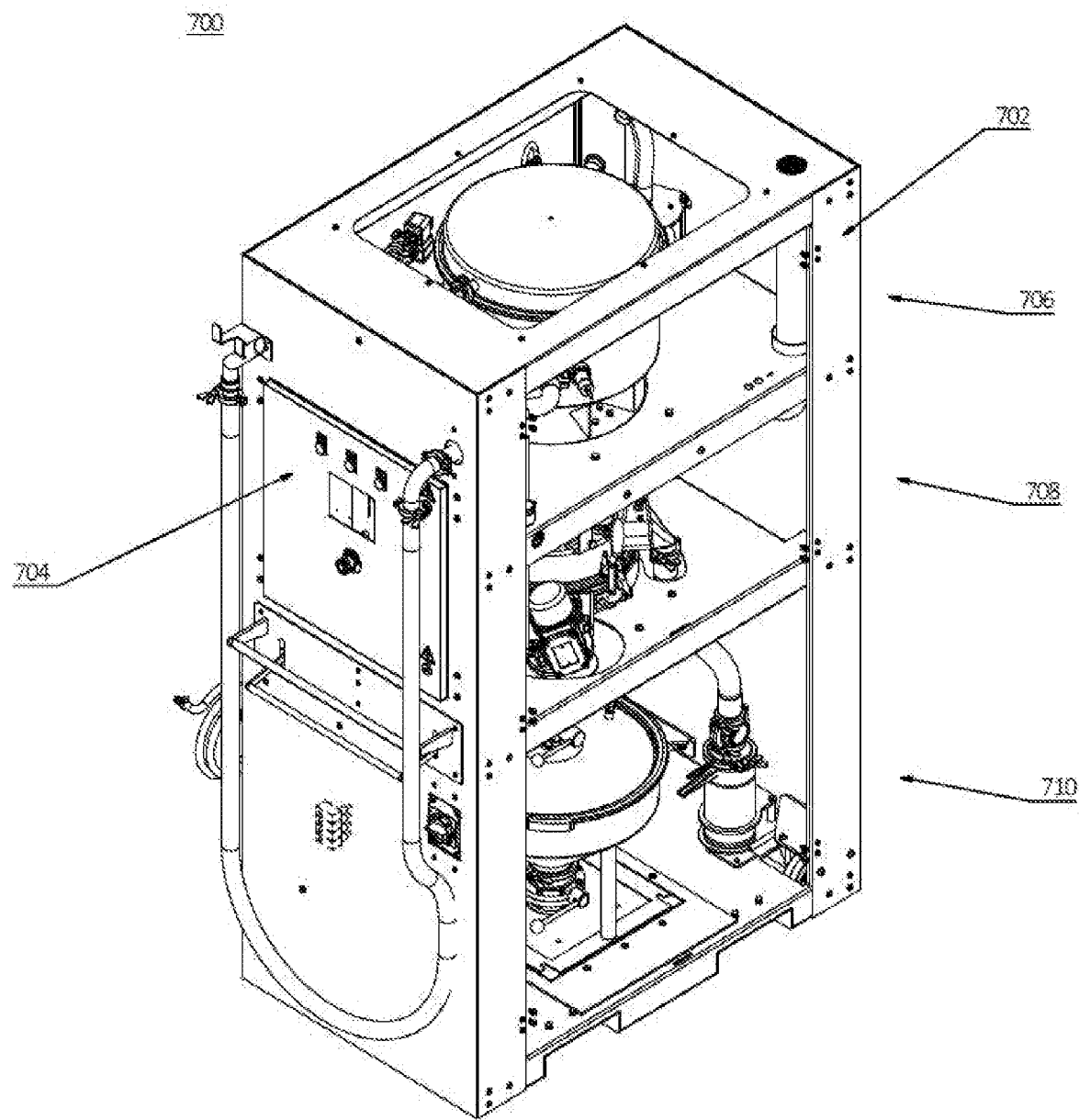
FIG. 16 shows schematically a sieve system assembly in accordance with one or more embodiments of the disclosure.

FIG. 16 shows an example of a sieve system assembly 700 in accordance with one or more embodiments. The assembly includes a frame 702 for mounting any of the sieve systems discussed herein. The frame in this example has a first, feed stage 706, for mounting and/or housing components of the sieve system relating to the feeding of powder to be screened. The frame in this example also has a second, sieve stage 708, for mounting and/or housing components of the sieve system relating to the screening of the powder by the sieve. The frame in this example also has a third, collection stage 710, for mounting and/or housing components of the sieve system relating to the collection of screened powder, such as fines collection and/or oversize material collection.

The assembly also includes a user interface 704 for allowing a user to receive output information from the controller and/or to enter input information to the controller for monitoring and controlling operation of the sieve system.

As will be appreciated, the various components, features, and characteristics of the sieve systems described herein may be provided as a sieve system assembly, the example of FIG. 16 being just one possible implementation.

The sieve system assembly 700 may be configured to be mobile, optionally being provided with wheels or casters or the like. While not shown in FIG. 16, the sieve system assembly 700 may be provided with doors, shutters, or covers so that media ingress into the system from the surrounding environment and/or media egress from the system to the surrounding environment may be prevented.

Implementations of the sieve system 600 and/or the sieve system assembly 700 may offer a vibratory sieve combined with a product conveying system that is designed specifically for processing powders in applications where space is of a premium and containment of product important. An operator or automated controller may convey recycled or virgin powder from a container (feed hopper) or printing machine via a simple gravity fed system or by vacuum conveying. The powder may then be fed into the sieve, either directly from the vacuum conveyor or from a holding hopper via a valve and feed regulating system. The one or more sieve motors, optionally combined with ultrasonic mesh activation, provide a sieving action that allows the (re-usable) powder (fines) to be separated from oversize powder. A gate (such as a pneumatic, inflatable seal) at the oversize discharge outlet opens to allow collection of the oversize in a container. An automatic (for example, pneumatic) or manual valve may be used under the screen or mesh surface to allow for collection of screened (re-usable) powder. Load cells may be used to provide an indication of the weight in each container and control feed. A pneumatic clamping system may be used to hold the sieve assembly (sieve deck) and base together under vibration. This may be replaced by a manual clamping system in some examples.

The user interface (such as a HMI) may be the main user interface. An emergency stop device may be provided to allow a safe shut-down of valve, vacuum, and/or motor operation, in the case of a fault or an emergency, as may be identified in the hazard analysis for the sieve.

The sequence of operation of the sieve system may vary from application to application. Also, the components used and their configuration may depend on the application at hand and/or particular user requirements.

The controller and the user interface may be configured to provide logical control of the screening process. Timers and/or set-point selection may be set to allow for automated operation of the sieve system. An alarm menu in the user interface may be configured to provide feedback to a user of any problems with the sieve system or the control system. Where provided, pneumatic solenoids and valves may be mounted outside of the user interface region (such as a control panel). However, such actuators, among others, may be controlled via the controller. An inert gas, such as argon, purge system may also be provided and controlled by the controller.

It is known that many powders can form a potentially explosive atmosphere when they form dust clouds in air (depending on particle size and/or powder concentration). The sieve systems described herein may be configured for use in such environments, in some examples according to local and/or national regulations. Furthermore, inert gas purging may be used to maintain powder quality but may also be used to reduce these operating hazards.

The sieve systems described herein may be used for a number of different applications. One example application is in heavy industrial use. This may be performed by trained operators, with maintenance undertaken by trained technicians. In such applications, the region inside the sieve system may be considered as hazard rating Z20. Outside the sieve system may be considered as hazard rating Z22 (indicating a hazardous area). If the product to be screened is non-hazardous, then the outside of the sieve system may be considered a safe area.

The sieve systems described herein may convey virgin or used product in the form of a dry powder from a machine or vessel to the sieve machine or feed container (holding hopper). The sieve may then be used to separate dry particles into sieve fractions, by passing the product through vibrating screens of specific mesh apertures. In some examples, the product may be hazardous to health and/or be of a potentially explosive nature.

In typical applications, normal controller operating conditions would be in a temperature range of −20° C. to +40° C. In typical applications, normal sieve operating conditions would be in a temperature range of −30° C. to +80° C. In some examples, powder to be reclaimed from a 3D printing system may have a temperature of up to 80° C. or so just after the end of a print or build run. The powder to be reclaimed may then be introduced into the sieve system so may generally increase the local temperature within the sieve system. Outside of the sieve system, however, the ambient temperature would not be expected to rise above 40° C., or 45° C. at most.

Typically, the powder to be screened should be dry and at a temperature no greater than the typical operating conditions of the sieve. The handling of potentially explosive dusts that react to substances, e.g., moisture, which could possibly come into contact during conveyance or transfer, may mean that particularly safe work practices need to be implemented. Likewise, if a procedure prior to the operation of the sieve system creates a possible ignition hazard, such as with hot materials, particular safe work practices may need to be implemented to ensure an explosion risk is not introduced into the sieving equipment.

The sieve systems described herein may provide health monitoring of the sieve systems during operation. With the various sieve systems described, one or more of the following benefits may be provided:

Controlled feed of process media into the sieve based on load sensor conditions

Excessive product (oversize) detection and automated removal

Indication of a blocked or partially blocked sieve screen, or mesh

Fault indication of a damaged sieve, such as a torn screen or mesh, or a missing sieve Fault indication of a damaged oversize outlet gate, such as a pneumatic seal $O_2$ monitoring on purged systems and fault indication Fault indication of a blockage or impediment in the feed container supply Automated shutdown of the powder conveyance cycle when the feed container is empty or blocked Automated shutdown of the powder conveyance cycle when the feed container is full Sieving virgin powders to guarantee the quality of virgin powder before it enters a subsequent production process, such as in a 3D printer Closed-loop powder recovery, allowing the sieve system to be connected directly to a 3D printer, facilitating the transportation of powder quickly and safely to the sieve system, and the prompt return to the 3D printer, ready for re-use Build chamber evacuation to quickly evacuate and then screen loose, unused powder from the 3D printer build chamber, which can help to reduce or minimize production downtime Fully modular system to offer suitability for numerous powder handling tasks, with various modifications available, including inert atmosphere and multiple material use Reduce or minimize operator involvement, with examples having a simple, one-button operation, and a controller which is programmable for multiple settings Compact & manoeuvrable design, with some examples being configured to fit readily through standard doorways The sieve system may be inert gas purged, which may help to preserve powders which may be susceptible to oxidation and moisture The feed and flow management by the controller allows for the automation of the flow of powder through the system, helping to optimise the process, without the need for constant monitoring, which may afford a user time to be spent on other, valuable tasks Monitoring and control of the feeding of powder to be screened from the feed container 140 to the sieve 112 by the sieve systems described herein. This may be performed by monitoring the change in feed container load while discharging powder to the sieve 112 (for example, while the feed valve 142 is open). If the change in feed container load is lower than a pre-determined value, this may indicate a feed blockage or impediment. Alternatively or additionally, the monitoring may be performed by monitoring the feed rate while (attempting to be) discharging powder to the sieve 112 (for example, while the feed valve 142 is open). If the feed rate is lower than a pre-determined value, this may indicate a feed blockage or impediment. Alternatively or additionally still, the monitoring may be performed by monitoring the sieve load while powder is intended to be discharged to the sieve 112 (for example, while the feed valve 142 is open). If the sieve load does not increase to reach a pre-determined value, this may indicate a feed blockage or impediment.

The discussion of the monitoring and control of various operational parameters of the sieve system has been provided in each case independently of other operational parameters, for simplicity of description. It will be appreciated that individual operational parameters may be taken in isolation from other operational parameters to determine a fault or unacceptable operating condition when the other operational parameters are normal; optionally, having been separately determined by the controller 160 as being within an acceptable range(s) or limit(s). For example, if other components of the sieve system are performing acceptably, then a fines rate low set point being reached may be determined to be indicative of an excess of powder on the sieve and not, for example, the feed container 140 being shut off or empty.

Among other applications, the sieve systems described herein may be used to condition additive powders for 3D printing before use in the production process, to ensure the quality of the final product. Such additive materials may include one or more of titanium powder, aluminium powder, copper powder, other metal powders, ceramic powders, and plastic powders.

For example, in one example, a titanium powder may be screened. The titanium powder may be vacuum conveyed into the system. The unit may be purged with an inert gas. All operations can be controlled and monitored with a user interface (such as a HMI screen). The powder may then be fed to a high-performance vibratory sieve. Good powder may be collected in the container below and qualified for use in production. Any oversize contamination may be removed via a separate outlet and can be readily disposed of. A compact and manoeuvrable design allows easy integration into production processes, and minimal contact parts means quick and easy dismantling and short changeover times may be achieved.

Examples of sieve systems have been described above with the sieve including an oversize discharge outlet. An oversize container may be coupled to the oversize discharge outlet for receiving second particles of oversize material. The oversize container may receive the second particles by gravity feed. Alternatively, reduced pressure or vacuum suction may be provided to draw off the second particles from the oversize discharge outlet. Under such reduced pressure or vacuum, the second particles may be directed into the oversize container or conveyed away from the sieve system to a remote container or to waste. In other examples, the sieve is not provided with an oversize discharge outlet. Removal of the second particles may then be performed by disassembly of the sieve after a batch of powder has been processed.

Although time points have been referred to above as a first time, a fifth time, etc., it will be appreciated that these time points may be different times or the same times, and earlier times or later times than times than each other or other times, depending on the method being performed. That is, within a particular method being performed, different time points may be subsequent points in time, but, between different methods, the relative time points may not be important.

Other variations, modifications, and embodiments will be apparent to the skilled person and are intended to form part of the disclosure.

The invention claimed is:

1. A method for screening material in a sieve system, comprising:
a sieve for screening material by selectively passing first particles of the material and not passing second particles of the material based on respective dimensions of the first and second particles relative to dimensions of screening apertures in the sieve;
a holding container for feeding material to be screened to the sieve; and
a fines container for receiving the first particles screened by the sieve, the method comprising:
measuring a first fines container load at a first time;
measuring a second fines container load at a second time;
determining a fines rate by determining a rate of change of the fines container load based on the measured first and second fines container loads and the first and second times;
determining an operating condition of the sieve system based on the determined fines rate; and
determining that the fines rate is equal to or greater than a fines rate high set point and determining the operating condition to be representative of a damaged or missing sieve wherein the sieve system further comprises an oversize container for receiving the second particles from an oversize discharge outlet, and the method further comprises:
measuring a first holding container load, a third fines container load, and a first oversize container load at a third time;
measuring a second holding container load, a fourth fines container load, and a second oversize container load at a fourth time;
determining a sieve load based on a difference between a) a decrease in the holding container load between the third and fourth times, and b) a sum of an increase in the fines container load and an increase in the oversize container load between the third and fourth times; and
if the sieve load is equal to or lower than a sieve load low set point, determining the operating condition to be representative, or further representative, of an underloading of material on the sieve, and
if the sieve load is equal to or greater than a sieve load high set point, determining the operating condition to be representative, or further representative, of an overloading of material on the sieve.

2. The method of claim 1, further comprising:
measuring a fifth fines container load at a fifth time;
measuring a sixth fines container load at a sixth time;
determining a second fines rate by determining a second rate of change of the fines container load based on the measured fifth and sixth fines container loads and the fifth and sixth times;
determining an other operating condition of the sieve system based on the determined second fines rate; and
determining that the second fines rate is equal to or lower than a fines rate low set point and determining the other operating condition to be representative, or further representative, of an excess of material on the sieve.

3. The method of claim 1, further comprising stopping the sieve system in response to determining the operating condition to be representative, or further representative, of a damaged or missing sieve.

4. The method of claim 1, further comprising:
measuring a third holding container load at a fifth time;
measuring a fourth holding container load at a sixth time;
determining a feed rate by determining a rate of change of the holding container load based on the measured third and fourth holding container loads and the fifth and sixth times; and
determining a feed blockage, or at least a partial feed blockage, from the holding container to the sieve when the determined feed rate is equal to or lower than a feed rate low set point.

5. The method of claim 1, further comprising:
operating a material conveyance system to convey material to be screened from a supply container to the holding container;
measuring a third holding container load at a fifth time;
measuring a fourth holding container load at a sixth time, the fifth and sixth times during the operating of the material conveyance system;
determining a conveyance rate by determining a rate of change of the holding container load based on the measured third and fourth holding container loads and the fifth and sixth times; and
determining a material conveyance system blockage or at least a partial material conveyance system blockage, and/or that the supply container is empty or substantially empty, when the determined conveyance rate is equal to or lower than a conveyance rate low set point.

6. The method of claim 1, further comprising conveying screened material from the fines container to an additive manufacturing system.

7. The method of claim 1, further comprising conveying unused material from an additive manufacturing system build chamber to the holding container for screening by the sieve system for potential re-use in an additive manufacturing system.

8. A method for screening material in a sieve system comprising:
a sieve for screening material by selectively passing first particles of the material and not passing second particles of the material based on respective dimensions of the first and second particles relative to dimensions of screening apertures in the sieve;
a holding container for feeding material to be screened to the sieve; and
a fines container for receiving the first particles screened by the sieve, the method comprising:
measuring a first fines container load at a first time;
measuring a second fines container load at a second time;
determining a fines rate by determining a rate of change of the fines container load based on the measured first and second fines container loads and the first and second times;
determining an operating condition of the sieve system based on the determined fines rate;
determining that the fines rate is equal to or lower than a fines rate low set point and determining the operating condition to be representative, or further representative, of an excess of material on the sieve; and
discharging material from the sieve to an oversize discharge outlet for removing the second particles from the sieve in response to determining the operating condition to be representative, or further representative, of an excess of material on the sieve.

9. The method of claim 8, further comprising:
measuring a third fines container load at a third time;
measuring a fourth fines container load at a fourth time;
determining a second fines rate by determining a second rate of change of the fines container load based on the measured third and fourth fines container loads and the third and fourth times;
determining that the second fines rate is greater than the fines rate low set point; and
updating the operating condition to no longer be representative, or further representative, of an excess of material on the sieve.

10. The method of claim 8, further comprising:
measuring a third fines container load at a third time;
measuring a fourth fines container load at a fourth time;
determining a second fines rate by determining a second rate of change of the fines container load based on the measured third and fourth fines container loads and the third and fourth times;
determining that the second fines rate is equal to or lower than the fines rate low set point; and
updating the operating condition to be representative, or further representative, of a blocked, or at least partially blocked, sieve.

11. The method of claim 10, further comprising repeating the step of discharging material from the sieve to the oversize discharge outlet for removing the second particles from the sieve one or two or more times before updating the operating condition to be representative, or further representative, of a blocked, or at least partially blocked, sieve.

12. The method of claim 8, wherein the sieve system further comprises an oversize container for receiving the second particles from the oversize discharge outlet, the method further comprising:
measuring a first oversize container load at a third time;
measuring a second oversize container load at a fourth time, wherein a period between the third and fourth times does not include operation of the sieve system to discharge material to the oversize discharge outlet for removing the second particles from the sieve;
determining an increase in the oversize container load based on the measured first and second oversize container loads; and
determining a fault condition with the oversize discharge outlet in response to determining the increase in the oversize container load.

13. The method of claim 8, wherein the sieve system further comprises an oversize container for receiving the second particles from the oversize discharge outlet, the method further comprising:
measuring a first holding container load, a third fines container load, and a first oversize container load at a third time;
measuring a second holding container load, a fourth fines container load, and a second oversize container load at a fourth time;
determining a sieve load based on a difference between a) a decrease in the holding container load between the third and fourth times, and b) a sum of an increase in the fines container load and an increase in the oversize container load between the third and fourth times; and
if the sieve load is equal to or lower than a sieve load low set point, determining the operating condition to be representative, or further representative, of an underloading of material on the sieve, and if the sieve load is equal to or greater than a sieve load high set point, determining the operating condition to be representative, or further representative, of an overloading of material on the sieve.

14. A sieve system for screening material, the sieve system comprising:
a sieve for screening material by selectively passing first particles of the material and not passing second particles of the material based on respective dimensions of the first and second particles relative to dimensions of screening apertures in the sieve;
a holding container for feeding material to be screened to the sieve;
a fines container for receiving the first particles screened by the sieve;
a fines load sensor for measuring a fines container load;
a controller configured to:
  measure a first fines container load at a first time;
  measure a second fines container load at a second time;
  determine a fines rate by determining a rate of change of the fines container load based on the measured first and second fines container loads and the first and second times;
  determine an operating condition of the sieve system based on the determined fines rate; and
  determine the operating condition to be representative of a damaged or missing sieve responsive to determining that the fines rate is equal to or greater than a fines rate high set point;
an oversize container for receiving the second particles screened by the sieve;
an oversize load sensor for measuring an oversize container load; and
an oversize discharge outlet for removing the second particles from the sieve into the oversize container,
wherein the controller is further configured to:
  measure a first oversize container load at a third time;
  measure a second oversize container load at a fourth time, wherein a period between the third and fourth times does not include operation of the sieve system to discharge material to the oversize discharge outlet for removing the second particles from the sieve;
  determine an increase in the oversize container load based on the measured first and second oversize container loads; and
  determine a fault condition with the oversize discharge outlet in response to determining the increase in the oversize container load.

15. The sieve system of claim 14, further comprising a feed load sensor for measuring a holding container load, wherein the controller is further configured to:
  measure a first holding container load at a fifth time;
  measure a second holding container load at a sixth time;
  determine a feed rate by determining a rate of change of the holding container load based on the measured first and second holding container loads and the fifth and sixth times; and
  determine a feed blockage, or at least a partial feed blockage, from the holding container to the sieve when the determined feed rate is equal to or lower than a feed rate low set point.

16. The sieve system of claim 14, further comprising:
a supply container for supplying material to be screened;
a material conveyance system for conveying the material to be screened from the supply container to the holding container; and
a feed load sensor for measuring a holding container load, wherein the controller is further configured to:
  operate a material conveyance system to convey material to be screened from a supply container to the holding container;
  measure a first holding container load at a fifth time;
  measure a second holding container load at a sixth time, the fifth and sixth times during the operating of the material conveyance system;
  determine a conveyance rate by determining a rate of change of the holding container load based on the first and second holding container loads and the fifth and sixth times; and
  determine a material conveyance system blockage or at least a partial material conveyance system blockage, and/or that the supply container is empty or substantially empty, when the determined conveyance rate is equal to or lower than a conveyance rate low set point.

17. A 3D printing system comprising:
an additive manufacturing system comprising a build chamber; and
the sieve system of claim 14.

18. The 3D printing system of claim 17, wherein the additive manufacturing system and the sieve system form a closed loop system.

19. The sieve system of claim 14, wherein the controller is further configured to determine the operating condition to be representative, or further representative, of an excess of material on the sieve responsive to determining that the fines rate is equal to or lower than a fines rate low set point.

* * * * *